(12) United States Patent
Togashi et al.

(10) Patent No.: US 7,710,711 B2
(45) Date of Patent: May 4, 2010

(54) MULTILAYER CAPACITOR

(75) Inventors: Masaaki Togashi, Tokyo (JP); Takeshi Wada, Tokyo (JP)

(73) Assignee: TDK Corporation, Tokyo (JP)

( * ) Notice: Subject to any disclaimer, the term of this patent is extended or adjusted under 35 U.S.C. 154(b) by 81 days.

(21) Appl. No.: 12/127,360

(22) Filed: May 27, 2008

(65) Prior Publication Data

US 2008/0297977 A1    Dec. 4, 2008

(30) Foreign Application Priority Data

May 30, 2007   (JP)   ............................. 2007-143952

(51) Int. Cl.
*H01G 4/228*   (2006.01)
(52) U.S. Cl. .................................... 361/309; 361/306.3
(58) Field of Classification Search .............. 361/306.1, 361/306.3, 308.1, 309
See application file for complete search history.

(56) References Cited

U.S. PATENT DOCUMENTS

| | | | | |
|---|---|---|---|---|
| 5,716,532 | A | * | 2/1998 | Yializis et al. .................. 216/6 |
| 5,758,398 | A | * | 6/1998 | Rijnbeek et al. ........... 29/25.42 |
| 6,144,547 | A | * | 11/2000 | Retseptor .................... 361/303 |

FOREIGN PATENT DOCUMENTS

| | | |
|---|---|---|
| JP | A 2004-193352 | 7/2004 |
| JP | A-2004-253425 | 9/2004 |
| JP | A 2004-266110 | 9/2004 |
| JP | A 2007-103496 | 4/2007 |

OTHER PUBLICATIONS

Office Action issued for Japanese Patent Application No. 2007-143952 on Jun. 16, 2009.

* cited by examiner

*Primary Examiner*—Eric Thomas
(74) *Attorney, Agent, or Firm*—Oliff & Berridge, PLC

(57) ABSTRACT

A first terminal electrode has a first electrode portion disposed on a first face and connected to a first internal electrode, and a second electrode portion disposed on a third face and connected to the first electrode portion. A second terminal electrode has a first electrode portion disposed on a second face and connected to a second internal electrode, and a second electrode portion disposed on the third face and connected to the first electrode portion. Each of the second electrode portions of the first and second terminal electrodes, when viewed along a second direction perpendicular to the third face, is arranged with a gap in a third direction perpendicular to the second directions so as to sandwich at least a portion of an end in the first direction of an element body region sandwiched between the first internal electrode and the second internal electrode, at an end in the first direction of the second electrode portion.

11 Claims, 26 Drawing Sheets

Fig. 9

| SAMPLE No. | Lt (mm) | Wt (mm) | Lgap (mm) | CvL (mm) | A1 (mm²) | A2 (mm²) | A2/A1 | MAXIMUM VIBRATION AMPLITUDE (nm) |
|---|---|---|---|---|---|---|---|---|
| 1 | 0.8 | 0.8 | 0.2 | 0.1 | 0.64 | 0.42 | 0.66 | 21 |
| 2 | 0.8 | 0.6 | 0.2 | 0.1 | 0.48 | 0.3 | 0.63 | 20 |
| 3 | 0.8 | 0.5 | 0.2 | 0.1 | 0.4 | 0.24 | 0.60 | 18 |
| 4 | 0.8 | 0.8 | 0.25 | 0.22 | 0.64 | 0.32 | 0.50 | 8 |
| 5 | 0.8 | 0.6 | 0.25 | 0.2 | 0.48 | 0.22 | 0.46 | 7 |
| 6 | 0.8 | 0.5 | 0.25 | 0.2 | 0.4 | 0.165 | 0.41 | 5.5 |
| 7 | 0.6 | 0.8 | 0.3 | 0.2 | 0.48 | 0.18 | 0.38 | 5 |
| 8 | 0.6 | 0.6 | 0.3 | 0.2 | 0.36 | 0.12 | 0.33 | 4 |
| 9 | 0.6 | 0.5 | 0.3 | 0.2 | 0.3 | 0.09 | 0.30 | 4 |
| 10 | 0.3 | 0.5 | 0.3 | 0.2 | 0.15 | 0 | 0 | 3.5 |

MULTILAYER CAPACITOR

BACKGROUND OF THE INVENTION

1. Field of the Invention

The present invention relates to a multilayer capacitor.

2. Related Background Art

A known multilayer capacitor is one having a capacitor element body with a dielectric property having first and second faces facing each other, and a third face extending in a first direction in which the first and second faces face each other, so as to connect the first and second faces; a first internal electrode with an end exposed in the first face and a second internal electrode with an end exposed in the second face, the first and second internal electrodes being arranged in the capacitor element body so as to face each other in a second direction perpendicular to the first direction and to the third face, while sandwiching at least a portion of the capacitor element body; a first terminal electrode connected to the first internal electrode; and a second terminal electrode connected to the second internal electrode (e.g., cf. Japanese Patent Application Laid-open No. 2004-253425). In the multilayer capacitor described in the Laid-open No. 2004-253425, the first terminal electrode has a first electrode portion disposed on the first face and connected to the exposed portion of the first internal electrode in the first face, and a second electrode portion disposed on the third face and connected to the first electrode portion. The second terminal electrode has a first electrode portion disposed on the second face and connected to the exposed portion of the second internal electrode in the second face, and a second electrode portion disposed on the third face and connected to the first electrode portion.

SUMMARY OF THE INVENTION

An object of the present invention is to provide a multilayer capacitor capable of preventing mechanical strain caused by electrostrictive effect in the capacitor element body with the dielectric property, from being transmitted to the first and second terminal electrodes.

Incidentally, when a voltage is applied to the multilayer capacitor having the capacitor element body with the dielectric property, the electrostrictive effect brings about mechanical strain at a level according to the applied voltage in the capacitor element body, particularly, in an element body region sandwiched between the first internal electrode and the second internal electrode. When an ac voltage is applied, the multilayer capacitor undergoes vibration accordingly. When the multilayer capacitor is mounted on an external substrate or the like, occurrence of such mechanical strain causes the vibration due to the mechanical strain to be transmitted through the first and second terminal electrodes to the external substrate or the like, and the transmission of vibration due to the mechanical strain to the external substrate or the like results in sounding in the substrate.

The inventors conducted elaborate research on a configuration capable of preventing the vibration due to the mechanical strain from being transmitted from the multilayer capacitor to the external substrate or the like. As a result, we found that the transmission of the vibration due to the mechanical strain was dominated mainly by transmission of vibration through the second electrode portions of the first and second terminal electrodes disposed on the third face to be opposed to the external substrate or the like. Particularly, the conventional multilayer capacitors, when viewed along a direction perpendicular to the third face, have a large area where the second electrode portions overlap with the element body region, and this is a configuration that extremely easily transmits the mechanical strain caused by the electrostrictive effect.

On the basis of the above-described research result, a multilayer capacitor according to the present invention is a multilayer capacitor comprising: a capacitor element body with a dielectric property having first and second faces facing each other, and a third face extending in a first direction in which the first and second faces face each other, so as to connect the first and second faces; a first internal electrode with an end exposed in the first face and a second internal electrode with an end exposed in the second face, the first internal electrode and second internal electrode being arranged in the capacitor element body so as to face each other in a second direction perpendicular to the first direction and to the third face, while sandwiching at least a portion of the capacitor element body; a first terminal electrode having a first electrode portion disposed on the fast face and connected to the exposed portion of the first internal electrode in the first face, and a second electrode portion disposed on the third face and connected to the first electrode portion; and a second terminal electrode having a first electrode portion disposed on the second face and connected to the exposed portion of the second internal electrode in the second face, and a second electrode portion disposed on the third face and connected to the first electrode portion; wherein the capacitor element body comprises an element body region sandwiched between the first internal electrode and the second internal electrode, and wherein, when viewed along the second direction, each of the second electrode portions of the first and second terminal electrodes is arranged with a gap in a third direction perpendicular to the first and second directions so as to sandwich at least a portion of an end in the first direction of the element body region, at an end in the first direction of the second electrode portion.

In the multilayer capacitor according to the present invention, when viewed along the second direction, each of the second electrode portions of the first and second terminal electrodes is arranged with the gap in the third direction so as to sandwich at least a portion of the end in the first direction of the element body region, at the end in the first direction of the second electrode portion, and therefore, when also viewed along the second direction, each second electrode portion overlaps just in a small area with the element body region. Consequently, this configuration is able to prevent the mechanical strain caused by the electrostrictive effect in the element body region of the capacitor element body, from being transmitted to the second electrode portions of the first and second terminal electrodes.

Preferably, each of the second electrode portions comprises a pair of first regions extending from an edge in the first direction of the third face and arranged with the gap in the third direction, and an area $A1$ of each of the first regions and an area $A2$ of an overlap thereof with the element body region when viewed along the second direction satisfy the following relation: $0 \leq A2/A1 \leq 0.50$. This configuration is able to effectively prevent the mechanical stain caused by the electrostrictive effect in the element body region of the capacitor element body, from being transmitted to the second electrode portions of the first and second terminal electrodes.

More preferably, the pair of first regions, when viewed along the second direction, do not overlap with the element body region; that is, $A2/A1=0$. In this case, since the pair of first regions of the second electrode portions do not overlap with the element body region when viewed along the second direction, there is no area where the pair of first regions of the second electrode portions overlap with the element body region when also viewed along the second direction. Consequently, this configuration is able to reliably prevent the mechanical strain caused by the electrostrictive effect in the element body region of the capacitor element body, from being transmitted to the second electrode portions of the first and second terminal electrodes.

Preferably, each of the second electrode portions further comprises a second region extending so as to connect the pair of first regions, and the second region does not overlap with the element body region when viewed along the second direction. In this case, since the second regions of the second electrode portions do not overlap with the element body region when viewed along the second direction, there is no area where the second electrode portions overlap with the element body region when also viewed along the second direction. As a result this configuration is able to reliably prevent the mechanical strain caused by the electrostrictive effect in the element body region of the capacitor element body, from being transmitted to the second electrode portions of the first and second terminal electrodes.

Preferably, the capacitor element body further has fourth and fifth faces extending in the first direction so as to connect the first and second faces and facing each other in the third direction, each of the first and second terminal electrodes has a third electrode portion disposed on the fourth and fifth faces and connected to the first and second electrode portions, and the third electrode portion does not overlap with the element body region when viewed along the third direction. This configuration is able to reliably prevent the mechanical strain caused by the electrostrictive effect in the element body region of the capacitor element body, from being transmitted to the third electrode portions.

Another multilayer capacitor according to the present invention is a multilayer capacitor comprising: a capacitor element body with a dielectric property having first and second faces facing each other, and a third face extending in a first direction in which the first and second faces face each other, so as to connect the first and second faces; a first internal electrode with an end exposed in the first face and a second internal electrode with an end exposed in the second face, the first internal electrode and second internal electrode being arranged in the capacitor element body so as to face each other in a second direction perpendicular to the first direction and to the third face, while sandwiching at least a portion of the capacitor element body; a first terminal electrode having a first electrode portion disposed on the first face and connected to the exposed portion of the first internal electrode in the first face, and a second electrode portion disposed on the third face and connected to the first electrode portion; and a second terminal electrode having a first electrode portion disposed on the second face and connected to the exposed portion of the second internal electrode in the second face, and a second electrode portion disposed on the third face and connected to the first electrode portion; wherein the capacitor element body comprises an element body region sandwiched between the first internal electrode and the second internal electrode, and wherein, when viewed along the second direction, each of the second electrode portions of the first and second terminal electrodes does not overlap with the element body region.

In the multilayer capacitor according to the present invention, the second electrode portions of the first and second terminal electrodes, when viewed along the second direction, do not overlap with the element body region, and therefore, when also viewed along the second direction there is no area where the second electrode portions overlap with the element body region. Consequently, this configuration is able to reliably prevent the mechanical strain caused by the electrostrictive effect in the element body region of the capacitor element body, from being transmitted to the second electrode portions of the first and second terminal electrodes.

Preferably, the capacitor element body further has fourth and fifth faces extending in the first direction so as to connect the first and second faces and facing each other in a third direction perpendicular to the first and second directions, each of the first and second terminal electrodes has a third electrode portion disposed on the fourth and fifth faces and connected to the first and second electrode portions, and the third electrode portion does not overlap with the element body region when viewed along the third direction. This configuration is able to reliably prevent the mechanical strain caused by the electrostrictive effect in the element body region of the capacitor element body, from being transmitted to the third electrode portions.

The present invention successfully provides the multilayer capacitor capable of preventing the mechanical strain caused by the electrostrictive effect in the capacitor element body with the dielectric property, from being transmitted to the first and second terminal electrodes.

The present invention will become more fully understood from the detailed description given hereinbelow and the accompanying drawings which are given by way of illustration only, and thus are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

FIG. 9 is a table showing the results of measurement of vibration amplitude of substrate against varying ratios of area A2 to area A1.

DESCRIPTION OF THE PREFERRED EMBODIMENTS

The preferred embodiments of the present invention will be described below in detail with reference to the accompanying drawings. In the description, the same elements or elements with the same functionality will be denoted by the same reference symbols, without redundant description.

Figure 1:
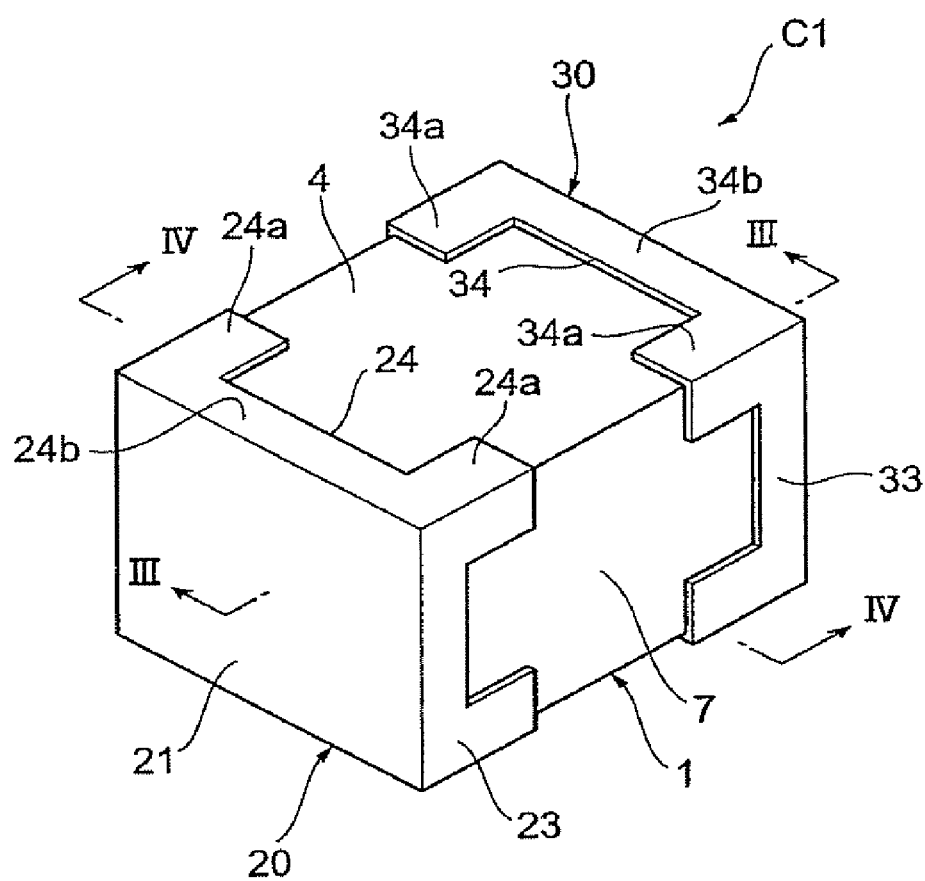
FIG. 1 is a schematic perspective view showing a multilayer capacitor according to an embodiment of the present invention.
Figure 2:
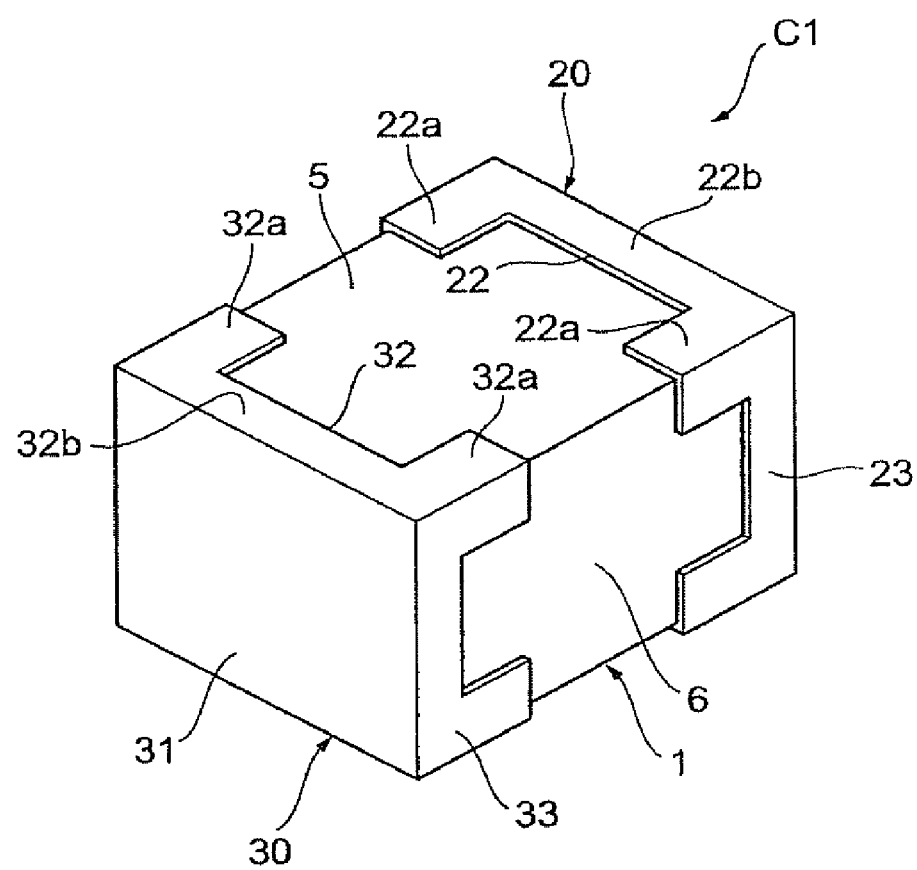
FIG. 2 is a schematic perspective view showing the multilayer capacitor according to the embodiment.
Figure 3:
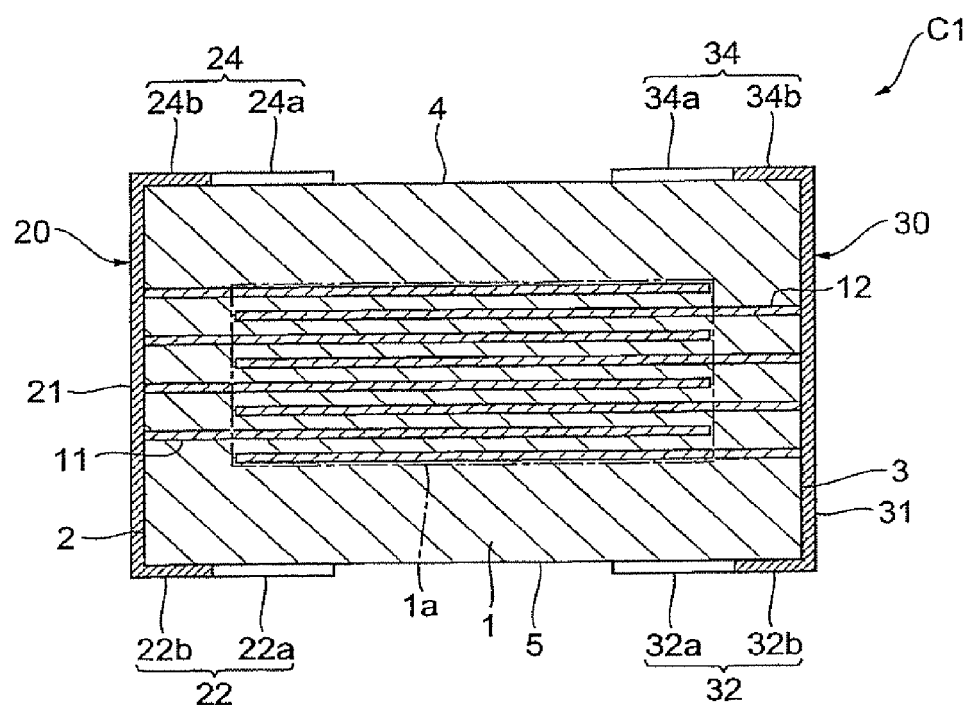
FIG. 3 is a drawing showing a sectional configuration along line III-III in FIG. 1.
Figure 4:
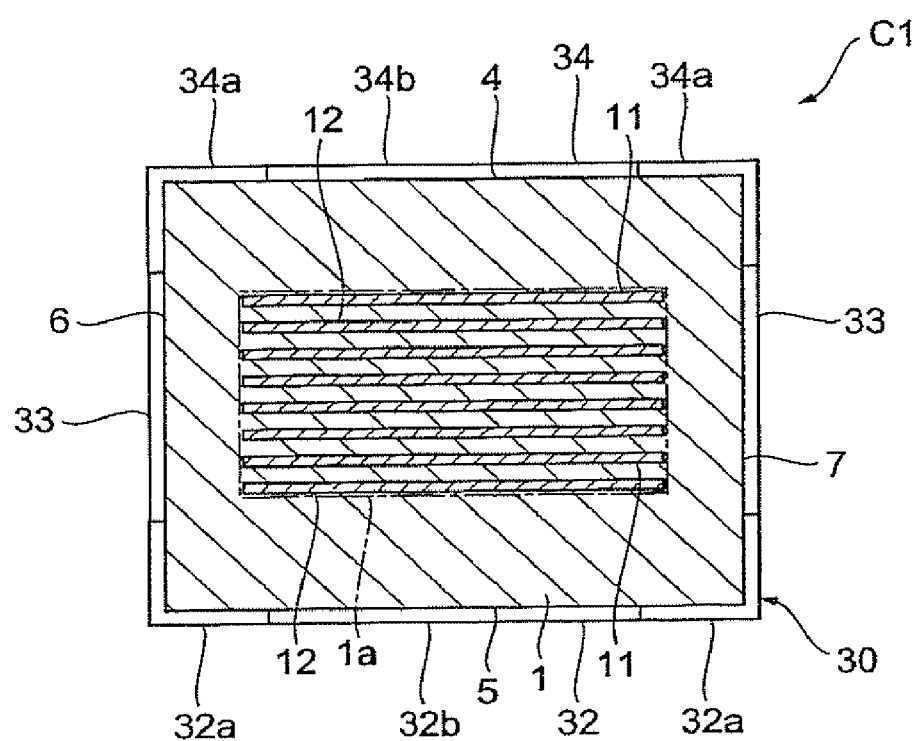
FIG. 4 is a drawing showing a sectional configuration along line IV-IV in FIG. 1.
Figure 5:
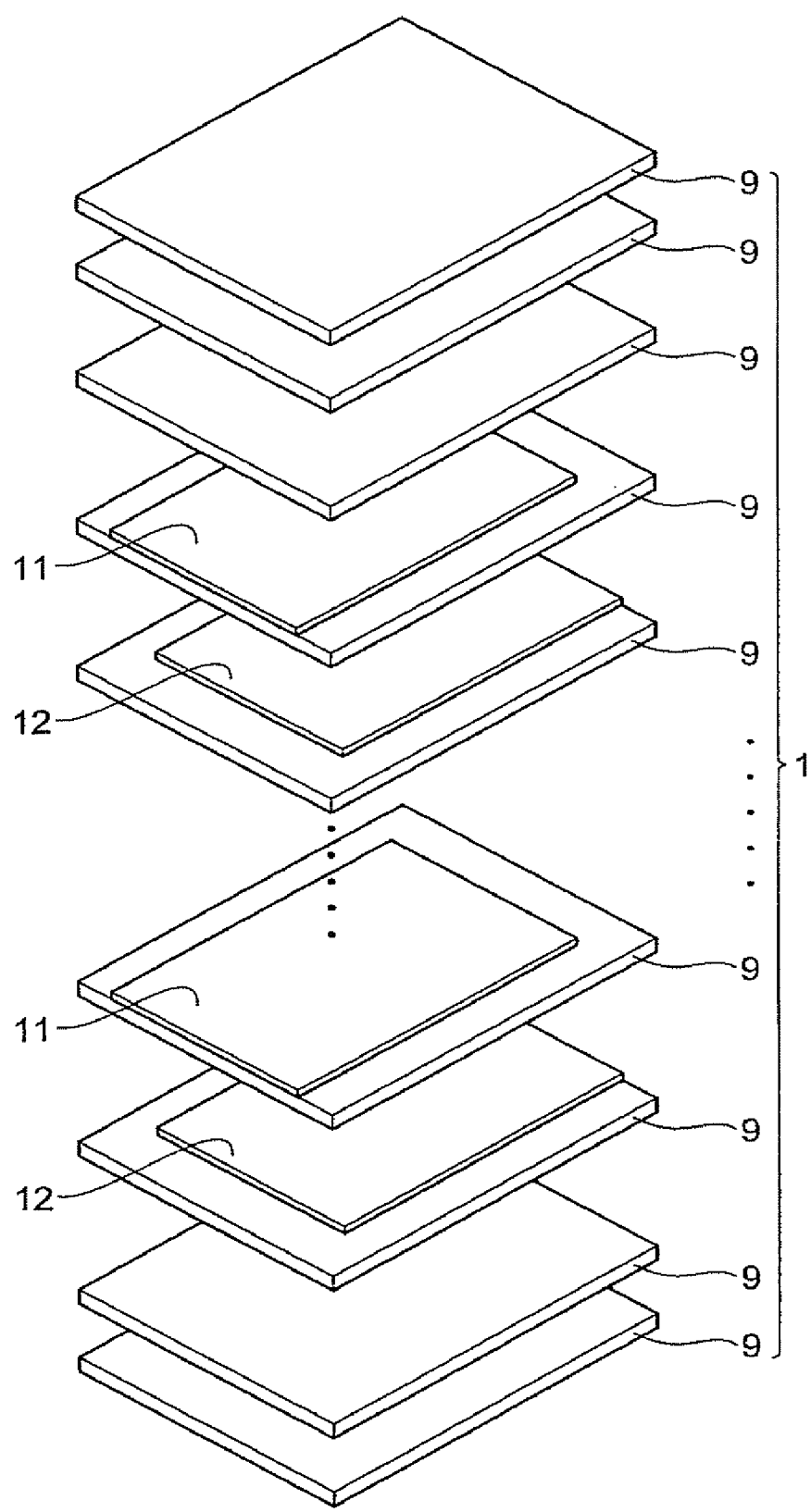
FIG. 5 is an exploded perspective view for explaining a configuration of a capacitor element body.

A configuration of a multilayer capacitor C1 according to an embodiment of the present invention will be described with reference to FIGS. 1 to 5. FIG. 1 is a schematic perspective view showing the multilayer capacitor of the present embodiment. FIG. 2 is a schematic perspective view showing the multilayer capacitor of the present embodiment. FIG. 3 is a drawing showing a sectional configuration along line III-III in FIG. 1. FIG. 4 is a drawing showing a sectional configuration along line IV-IV in FIG. 1. FIG. 5 is an exploded perspective view for explaining a configuration of a capacitor element body.

The multilayer capacitor C1, as shown in FIGS. 1 to 4, is provided with a capacitor element body 1 of a nearly rectangular parallelepiped shape, a plurality of first internal electrodes 11, a plurality of second internal electrodes 12, a first terminal electrode 20, and a second terminal electrode 30.

The capacitor element body 1 includes a first end face 2 and a second end face 3 facing each other, a first side face 4 and a second side face 5 facing each other, and a third side face 6 and a fourth side face 7 facing each other. The first side face 4 and the second side face 5 extend in a first direction in which the first and second end faces 2, 3 face each other, so as to connect the first and second end faces 2, 3. The third side face 6 and the fourth side face 7 extend in the first direction in which the first and second end faces 2, 3 face each other, so as to connect the first and second end faces 2, 3. The first direction, a second direction in which the first and second side faces 4, 5 face each other, and a third direction in which the third and fourth side faces 6, 7 face each other, are orthogonal to each other.

The capacitor element body 1, as shown in FIG. 5, is composed of a laminate of dielectric layers 9 in which the dielectric layers 9 are stacked in the second direction in which the first and second side faces 4, 5 face each other, and has the dielectric property. Each dielectric layer 9 is composed, for example, of a sintered body of a ceramic green sheet containing a dielectric ceramic (a dielectric ceramic such as a $BaTiO_3$ type ceramic, a $Ba(Ti,Zr)O_3$ type ceramic, or a $(Ba,Ca)TiO_3$ type ceramic). It is noted that the dielectric layers are integrally formed in the practical multilayer capacitor C1 so that no border can be visually recognized between them. In the present embodiment, the first side face 4 or the second side face 5 is a face to be opposed to a mount surface of an external substrate or the like.

The first internal electrodes 11 and the second internal electrodes 12 are alternately arranged in the capacitor element body 1 so that they face each other in the second direction so as to sandwich at least one dielectric layer 9 being a portion of the capacitor element body 1. This configuration causes the capacitor element body 1 to include an element body region 1a sandwiched between the first internal electrodes 11 and the second internal electrodes 12. The element body region 1a is an overlap of the dielectric layers 9 with the first internal electrodes 11 and the second internal electrodes 12, and region that substantially produces the capacitance of the multilayer capacitor C1. The element body region 1a is also a region that produces mechanical strain by the electrostrictive effect. When a voltage is impressed between the first internal electrodes 11 and the second internal electrodes 12, the element body region 1a expands in the second direction and constricts in the first and third directions.

The first and second side faces 4, 5 face each other in the facing direction of the first internal electrodes 11 and the second internal electrodes 12. Therefore, in a state in which the multilayer capacitor C1 is mounted on an external substrate or the like, the first internal electrodes 11 and the second internal electrodes 12 come to extend in a direction parallel to a mount surface of the external substrate or the like.

Each of the first internal electrodes 11 has an end drawn to the first end face 2, and the end is exposed in the first end face 2. Each of the second internal electrodes 12 has an end drawn to the second end face 3, and the end is exposed in the second end face 3. The first and second internal electrodes 11, 12 are made of an electrically conductive material usually used as internal electrodes in multilayer electric elements (e.g., a base metal Ni, or the like). The first and second internal electrodes 11, 12 are constructed as sintered bodies of an electroconductive paste containing the foregoing electrically conductive material.

The first terminal electrode 20 is disposed on the first end face 2 side of the capacitor element body 1. The first terminal electrode 20 has a first electrode portion 21, a second electrode portion 22, third electrode portions 23, and a fourth electrode portion 24. The first terminal electrode 20 is made, for example, by applying an electroconductive paste containing an electroconductive metal powder and glass frit, onto the exterior of the capacitor element body 1 and baking it. A plated layer is sometimes formed on the first terminal electrode 20 after baked, according to need. The application of the electroconductive paste can be implemented by dipping, printing, or the like.

The first electrode portion 21 is disposed on the first end face 2. The first electrode portion 21 is formed so as to cover portions of the first internal electrodes 11 exposed in the first end face 2, and is physically and electrically connected to the exposed portions. In the present embodiment the first electrode portion 21 is formed over the whole first end face 2.

The second electrode portion 22 is disposed on the second side face 5 and is connected to the first electrode portion 21 at the ridgeline made by the first end face 2 and the second side face 5. The second electrode portion 22 includes a pair of first regions 22a, and a second region 22b.

The pair of first regions 22a are located at corners of the second side face 5 and arranged with a gap in the third direction. The first regions 22a are separated from each other in the third direction. The pair of first regions 22a extend from one edge in the first direction of the second side face 5 (the ridgeline made by the first end face 2 and the second side face 5) toward the other edge in the first direction of the second side face 5. One of the first regions 22a extends along the ridgeline made by the second side face 5 and the third side face 6. The other first region 22a extends along the ridgeline made by the second side face 5 and the fourth side face 7. The second region 22b extends in the third direction along the ridgeline made by the first end face 2 and the second side face 5, so as to connect the pair of first regions 22a.

Figure 6:
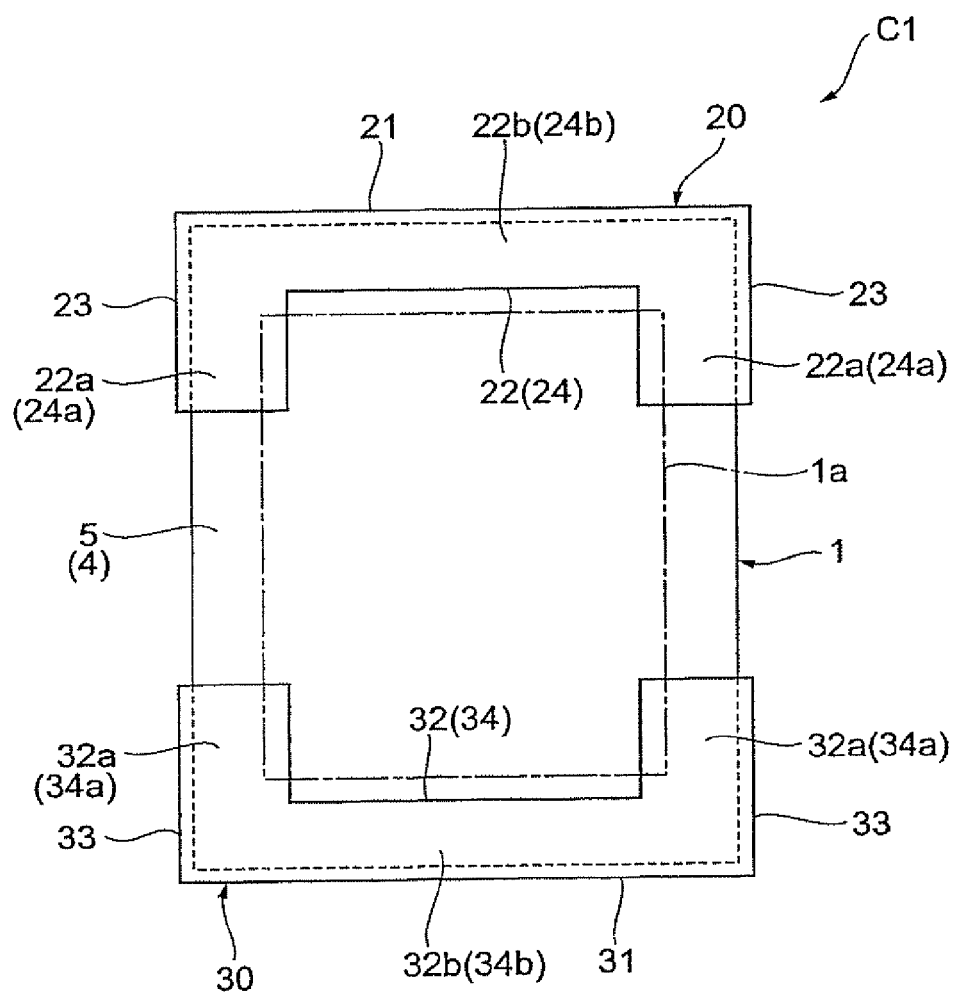
FIG. 6 is a schematic drawing for explaining a relation between first and second terminal electrodes and an element body region.

The pair of first regions 22a, as shown in FIG. 6, are arranged with the gap in the third direction so as to sandwich at least a portion of one end in the first direction of the element body region 1a, when viewed along the second direction perpendicular to the second side face 5. The second region 22b does not overlap with the element body region 1a when viewed along the second direction. Therefore, the second electrode portion 22 is arranged with the gap in the third direction so as to sandwich at least a portion of one end in the first direction of the element body region 1a, when viewed along the second direction, at the end in the first direction of the second electrode portion 22 (the end of the second electrode portion 22 near the other edge in the first direction of the second side face 5).

The third electrode portions 23 are disposed on the third and fourth side faces 6, 7, respectively, and are connected to the first electrode portion 21 at the respective ridgelines each made by the first end face 2 and the third or fourth side face 6, 7. The third electrode portions 23 are connected to the second electrode portion 22 (the first regions 22a) at the respective ridgelines each made by the second side face 5 and the third or fourth side face 6, 7. The third electrode portions 23 are connected to the fourth electrode portion 24 (first regions 24a) at the respective ridgelines each made by the first side face 4 and the third or fourth side face 6, 7.

Figure 7:
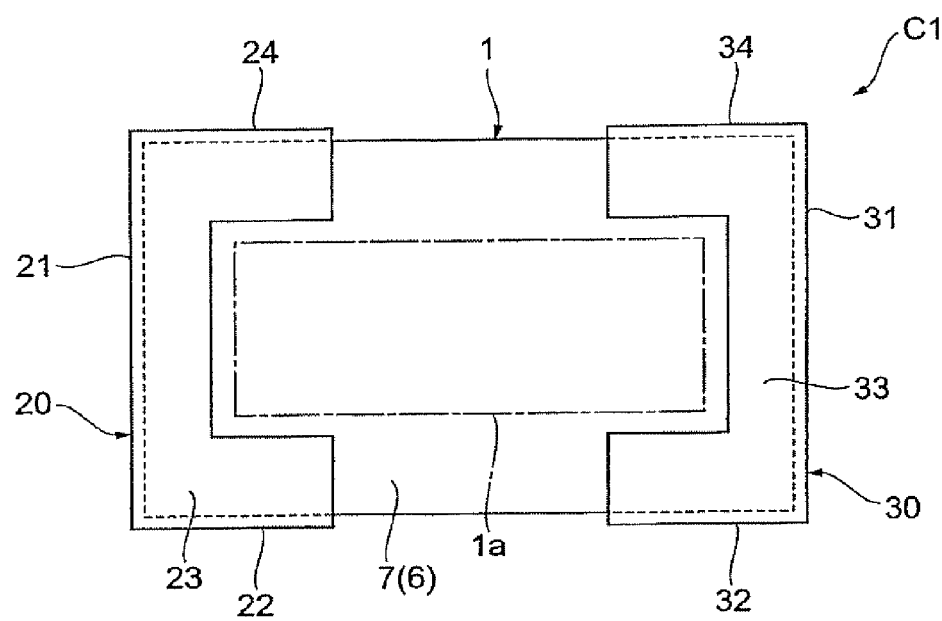
FIG. 7 is a schematic drawing for explaining a relation between first and second terminal electrodes and an element body region.

The third electrode portions 23 extend from one edge in the first direction of the third and fourth side faces 6, 7 (each ridgeline made by the first end face 2 and the third or fourth side face 6, 7) toward the other edge in the first direction of the third and fourth side faces 6, 7. The third electrode portions 23, as shown in FIG. 7, do not overlap with the element body region 1a when viewed along the third direction. In the present embodiment the third electrode portions 23 are of a near C shape.

The fourth electrode portion 24 is disposed on the first side face 4 and is connected to the first electrode portion 21 at the ridgeline made by the first end face 2 and the first side face 4. The fourth electrode portion 24 includes a pair of first regions 24a, and a second region 24b as the second electrode portion 22 does.

The pair of first regions 24a are located at corners of the first side face 4 and arranged with a gap in the third direction. The first regions 24a are separated from each other in the third direction. The pair of first regions 24a extend from one edge in the first direction of the first side face 4 (the ridgeline made by the first end face 2 and the first side face 4) toward the other edge in the first direction of the first side face 4. One of the first regions 24a extends along the ridgeline made by the first side face 4 and the third side face 6. The other first region 24a extends along the ridgeline made by the first side face 4 and the fourth side face 7. The second region 24b extends in the third direction along the ridgeline made by the first end face 2 and the first side face 4, so as to connect the pair of first regions 24a.

The pair of first regions 24a, as shown in FIG. 6, are arranged with the gap in the third direction so as to sandwich at least a portion of one end of the element body region 1a in the first direction, when viewed along the second direction perpendicular to the first side face 4. The second region 24b does not overlap with the element body region 1a when viewed along the second direction. Therefore, the fourth electrode portion 24 is arranged with the gap in the third direction so as to sandwich at least a portion of the one end of the element body region 1a in the first direction, when viewed along the second direction, at the end in the first direction of the fourth electrode portion 24 (the end of the fourth electrode portion 24 near the other edge in the first direction of the first side face 4).

The second terminal electrode 30 is disposed on the second end face 3 side of the capacitor element body 1. The second terminal electrode 30 has a first electrode portion 31, a second electrode portion 32, third electrode portions 33, and a fourth electrode portion 34. The second terminal electrode 30, like the first terminal electrode 20, is made, for example, by applying an electroconductive paste containing an electroconductive metal powder and glass fit, onto the exterior of the capacitor element body 1 and baking it. A plated layer is sometimes formed on the second terminal electrode 30 after baked, according to need.

The first electrode portion 31 is disposed on the second end face 3. The first electrode portion 31 is formed so as to cover portions of the second internal electrodes 12 exposed in the second end face 3, and is physically and electrically connected to the exposed portions. In the present embodiment the first electrode portion 31 is formed over the whole second end face 3.

The second electrode portion 32 is disposed on the second side face 5 and is connected to the first electrode portion 31 at the ridgeline made by the second end face 3 and the second side face 5. The second electrode portion 32 includes a pair of first regions 32a, and a second region 32b.

The pair of first regions 32a are located at corners of the second side face 5 and are arranged with a gap in the third direction. The first regions 32a are separated from each other in the third direction. The pair of first regions 32a extend from the other edge in the first direction of the second side face 5 (the ridgeline made by the second end face 3 and the second side face 5) toward the one edge in the first direction of the second side face 5. One of the first regions 32a extends along the ridgeline made by the second side face 5 and the third side face 6. The other first region 32a extends along the ridgeline made by the second side face 5 and the fourth side face 7. The second region 32b extends in the third direction along the ridgeline made by the second end face 3 and the second side face 5, so as to connect the pair of first regions 32a.

The pair of first regions 32a, as shown in FIG. 6, are arranged with the gap in the third direction so as to sandwich at least a portion of the other end of the element body region 1a in the first direction, when viewed along the second direction perpendicular to the second side face 5. The second region 32b does not overlap with the element body region 1a when viewed along the second direction. Therefore, the second electrode portion 32 is arranged with the gap in the third direction so as to sandwich at least a portion of the other end of the element body region 1a in the first direction when viewed along the second direction, at the end in the first direction of the second electrode portion 32 (the end of the second electrode portion 32 near the one edge in the first direction of the second side face 5).

The third electrode portions 33 are disposed on the third and fourth side faces 6, 7, respectively, and are connected to the first electrode portion 31 at the respective ridgelines each made by the second end face 3 and the third or fourth side face 6, 7. The third electrode portions 33 are connected to the second electrode portion 32 (first regions 32a) at the respective ridgelines each made by the second side face 5 and the third or fourth side face 6, 7. The third electrode portions 33 are connected to the fourth electrode portion 34 (first regions 34a) at the respective ridgelines each made by the first side face 4 and the third or fourth side face 6, 7.

The third electrode portions 33 extend from the other edge in the first direction of the third and fourth side faces 6, 7 (each ridgeline made by the second end face 3 and the third or fourth side face 6, 7) toward the one edge in the first direction of the third and fourth side faces 6, 7. The third electrode portions 33, as shown in FIG. 7, do not overlap with the element body region 1a when viewed along the third direction. In the present embodiment the third electrode portions 33 are of a near inverted C shape.

The fourth electrode portion 34 is disposed on the first side face 4 and is connected to the first electrode portion 31 at the ridgeline made by the second end face 3 and the first side face 4. The fourth electrode portion 34, like the second electrode portion 32, includes a pair of first regions 34a, and a second region 34b.

The pair of first regions 34a are located at corners of the first side face 4 and arranged with a gap in the third direction. The first regions 34a are separated from each other in the third direction. The pair of first regions 34a extend from the other edge in the first direction of the first side face 4 (the ridgeline made by the second end face 3 and the first side face 4) toward the one edge in the first direction of the first side face 4. One of the first regions 34a extends along the ridgeline made by the first side face 4 and the third side face 6. The other first region 34a extends along the ridgeline made by the first side face 4 and the fourth side face 7. The second region 34b extends in the third direction along the ridgeline made by the second end face 3 and the first side face 4, so as to connect the pair of first regions 34a.

The pair of first regions 34a, as shown in FIG. 6, are arranged with the gap in the third direction so as to sandwich at least a portion of the other end of the element body region 1a in the first direction, when viewed along the second direction perpendicular to the first side face 4. The second region 34b does not overlap with the element body region 1a when viewed along the second direction. Therefore, the fourth electrode portion 34 is arranged with the gap in the third direction so as to sandwich at least a portion of the other end of the element body region 1a in the first direction, when viewed along the second direction at the end in the first direction of the fourth electrode portion 34 (the end of the fourth electrode portion 34 near the one edge in the first direction of the first side face 4).

Incidentally, in the present embodiment, as described later, the area A1 of the first region 22a, 24a, 32a, 34a and the area A2 of the overlap of the first region 22a, 24a, 32a, 34a with the element body region 1a when viewed along the second direction, satisfy the following relation:

$$0 \leq A2/A1 \leq 0.50 \tag{1}.$$

In the present embodiment, as described above, each of the second electrode portions 22, 32 and the fourth electrode portions 24, 34 of the first and second terminal electrodes 20, 30 is arranged with the gap in the third direction so as to sandwich at least a portion of the end of the element body region 1a in the first direction, at the end thereof in the first direction when viewed along the second direction. Therefore, when viewed along the second direction, the second electrode portions 22, 32 and the fourth electrode portions 24, 34 overlap just in a small overlap area with the element body region 1a.

Incidentally, when the multilayer capacitor C1 is mounted with the second side face 5 being opposed to an external substrate or the like, the second electrode portions 22, 32 of the first and second terminal electrodes 20, 30 are connected to respective land electrodes on the external substrate or the like. In the multilayer capacitor C1, the electrostrictive effect takes place in the element body region 1a where an electric field acts. As described above, the second electrode portions 22, 32 overlap just in the small overlap area with the element body region 1a, and this prevents the mechanical strain caused by the electrostrictive effect in the element body region 1a of the capacitor element body 1 upon application of voltage between the first and second terminal electrodes 20, 30, i.e., between the first and second internal electrodes 11, 12, from being transmitted to the second electrode portions 22, 32.

On the other hand, when the multilayer capacitor C1 is mounted with the first side face 4 being opposed to an external substrate or the like, the mechanical strain caused by the electrostrictive effect in the element body region 1a of the capacitor element body 1 is also prevented from being transmitted to the fourth electrode portions 24, 34 because the fourth electrode portions 24, 34 overlap just in the small overlap area with the element body region 1a.

Accordingly, when the multilayer capacitor C1 is mounted with either the first side face 4 or the second side face 5 being opposed to an external substrate or the like and when a voltage is impressed, the external substrate or the like is prevented from sounding.

In the present embodiment each of the second electrode portions 22, 32 and the fourth electrode portions 24, 34 includes the pair of first regions 22a, 24a, 32a, 34a, and the area A1 of each first region 22a, 24a, 32a, 34a and the area A2 of the overlap of each first region 22a, 24a, 32a, 34a with the element body region when viewed along the second direction satisfy the aforementioned relation of Eq (1). This configuration is able to effectively prevent the mechanical stain caused in the element body region 1a of the capacitor element body 1, from being transmitted to the second electrode portions 22, 32 and the fourth electrode portions 24, 34.

Figure 8:
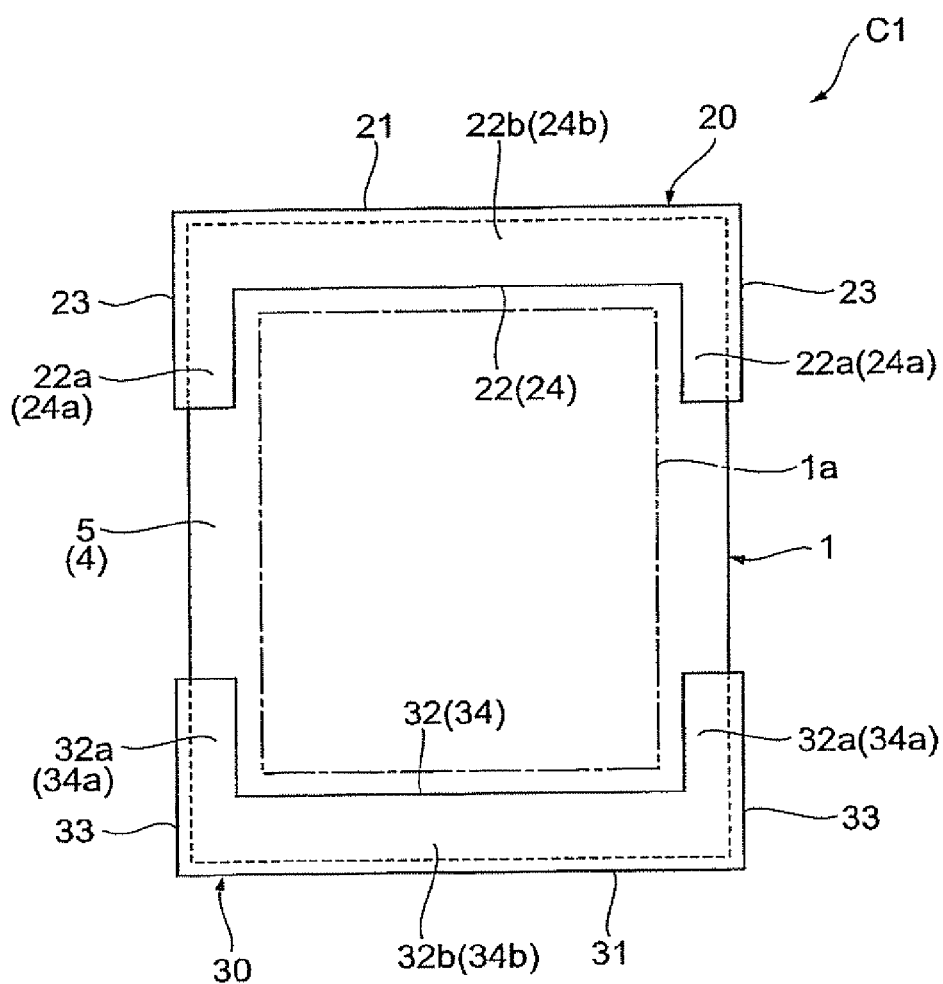
FIG. 8 is a schematic drawing for explaining a relation between first and second terminal electrodes and an element body region.

A more preferred configuration is such that the pair of first regions 22a, 24a, 32a, 34a do not overlap with the element body region 1a when viewed along the second direction, as shown in FIG. 8, i.e., A2/A1=0. In this case, the pair of first regions 22a, 24a, 32a, 34a do not overlap with the element body region 1a when viewed along the second direction, and each of the second electrode portions 22, 32 and the fourth electrode portions 24, 34 is arranged with a gap in the third direction so as to sandwich the end of the element body region 1a in the first direction, at the end in the first direction thereof when viewed along the second direction; therefore, when also viewed along the second direction, there is no area where the pair of first regions 22a, 24a, 32a, 34a overlap with the element body region 1a. This configuration is able to reliably prevent the mechanical strain caused in the element body region 1a of the capacitor element body 1, from being transmitted to the second electrode portions 22, 32 and the fourth electrode portions 24, 34. That the pair of first regions 22a, 24a, 32a, 34a do not overlap with the element body region 1a when viewed along the second direction means that the width in the third direction of each first region 22a, 24a, 32a, 34a is smaller than the distance in the third direction from the third or fourth side face 6, 7 (the edge in the third direction of the first and second side faces 4, 5) to the element body region 1a.

In the present embodiment the second regions 22b, 32b of the second electrode portions 22, 32 and the second regions 24b, 34b of the fourth electrode portions 24, 34 do not overlap with the element body region 1a when viewed along the second direction. In this configuration, when viewed along the second direction, there is no area where the second regions 22b, 24b, 32b, 34b overlap with the element body region 1a. As a result, this configuration is able to reliably prevent the mechanical strain caused in the element body region 1a of the capacitor element body 1, from being transmitted to the second electrode portions 22, 32 and the fourth electrode portions 24, 34. That the second regions 22b, 32b, 24b, 34b do not overlap with the element body region 1a when viewed along the second direction means that the width in the first direction of each second region 22b, 32b, 24b, 34b is smaller than the distance in the first direction from the first or second end face 2, 3 (the edge in the first direction of the first and second side faces 4, 5) to the element body region 1a.

In the present embodiment the third electrode portions 23, 33 of the first and second terminal electrodes 20, 30 do not overlap with the element body region 1a when viewed along the third direction. This configuration is able to reliably prevent the mechanical strain caused in the element body region 1a of the capacitor element body 1, from being transmitted to the third electrode portions 23, 33. Therefore, when the multilayer capacitor C1 is mounted on an external substrate or the like and when the third electrode portions 23, 33 are connected to respective land electrodes, the external substrate or the like is also prevented from sounding.

The relationship between the area A1 of the first region 22a, 24a, 32a, 34a and the area A2 of the overlap of the first region 22a, 24a, 32a, 34a with the element body region 1a when viewed along the second direction will be described below in detail.

Figure 10:
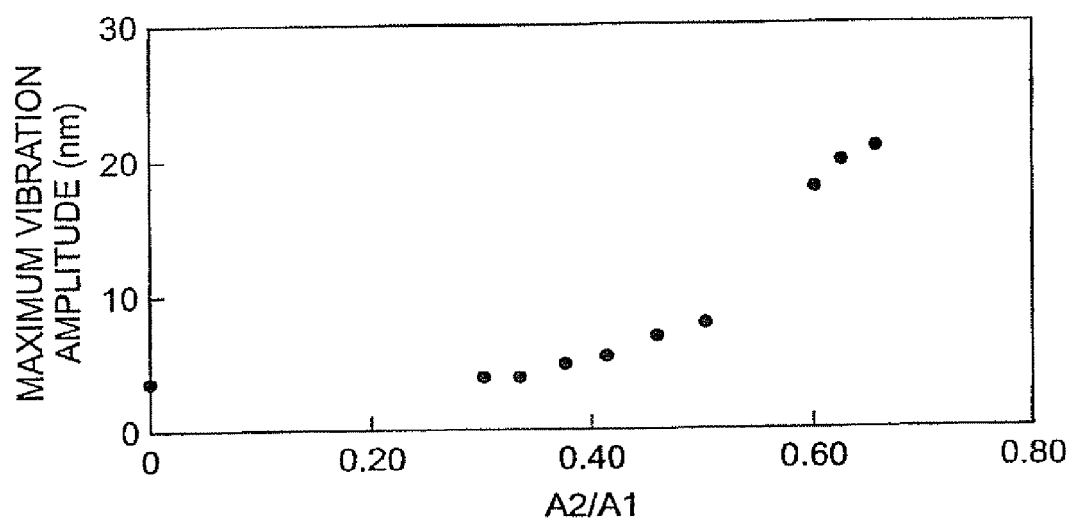
FIG. 10 is a diagram showing the results of measurement of vibration amplitude of substrate against varying ratios of area A2 to area A1.

The inventors conducted the following experiment in order to elucidate the relationship between the ratio (A2/A1) of the area A2 to the area A1 and the maximum vibration amplitude of a substrate with the multilayer capacitor C1 thereon. Specifically, samples (samples 1 to 11) were prepared with different ratios of area A2 to area A1, each sample was mounted on a substrate, and a vibration amplitude (nm) of each substrate was measured with application of an ac voltage AC1 Vrms to each sample. The measurement results are presented in FIGS. 9 and 10. FIG. 9 is a table showing the measurement results and FIG. 10 is a graph of the measurement results shown in FIG. 9. The samples had the same configuration except for the different ratios of area A2 to area A1 (areas A1, A2), and were designed as follows: the length in the first direction 3.2 mm; the length (width) in the third direction 2.5 mm; the length (height) in the second direction 2.0 mm; the capacitance 10 µF.

Figure 11:
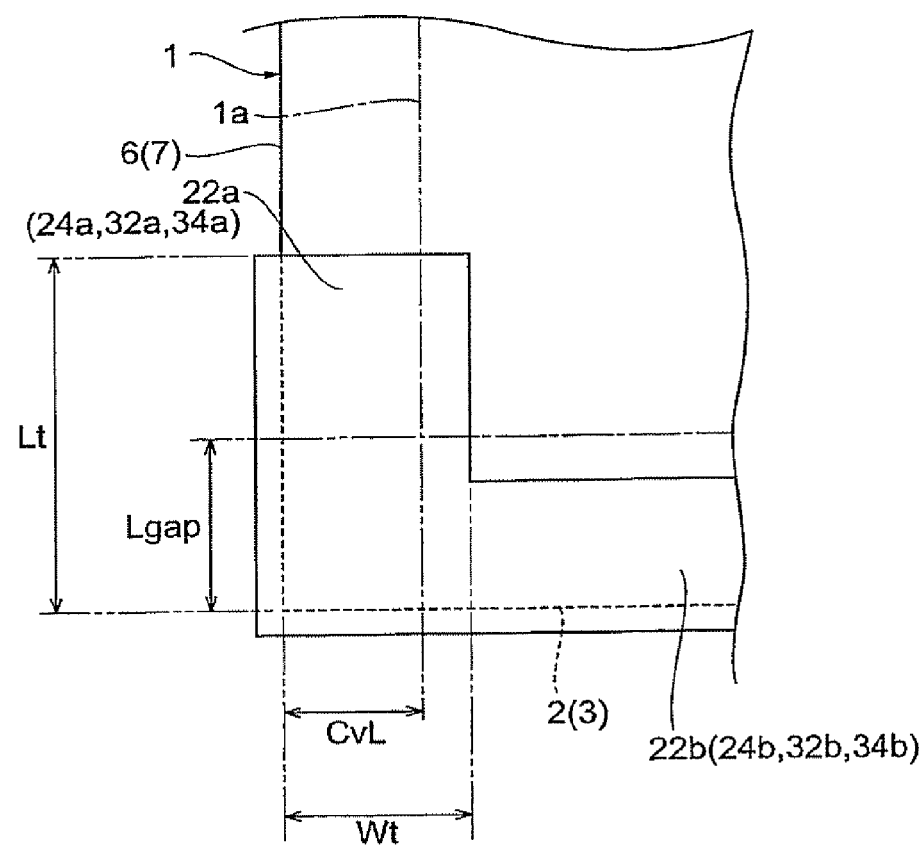
FIG. 11 is a schematic drawing for explaining a relation between area A1 and area A2.

In FIG. 9, Lt (mm), Wt (mm), Lgap (mm), and CvL (mm) are defined as shown in FIG. 11. Lt is the length in the first direction of the first region 22a, 24a, 32a, 34a. Wt is the length (width) in the third direction of the first region 22a, 24a, 32a, 34a. Lgap is the distance in the first direction between the element body region 1a and the first or second end face 2, 3 when viewed along the second direction. CvL is the distance in the third direction between the element body region 1a and the third or fourth side face 6, 7 when viewed along the second direction.

It is clear from the measurement results shown in FIGS. 9 and 10 that the maximum vibration amplitude of the substrate is not more than 10 nm and the vibration is extremely small when the ratio A2/A1 is set in the range of not less than 0 nor more than 0.50. The reason why 10 nm is adopted as a criterion for judgment is that when the maximum vibration amplitude is not more than 10 nm, a significant effect of reduction in noise (sound pressure) level of 10 dB or more is achieved as compared with the conventional multilayer capacitors of the configuration as described in Patent Document 1 and others.

First to fourth modification examples of the multilayer capacitor C1 of the present embodiment will be described below with reference to FIGS. 12 to 27.

Figure 12:
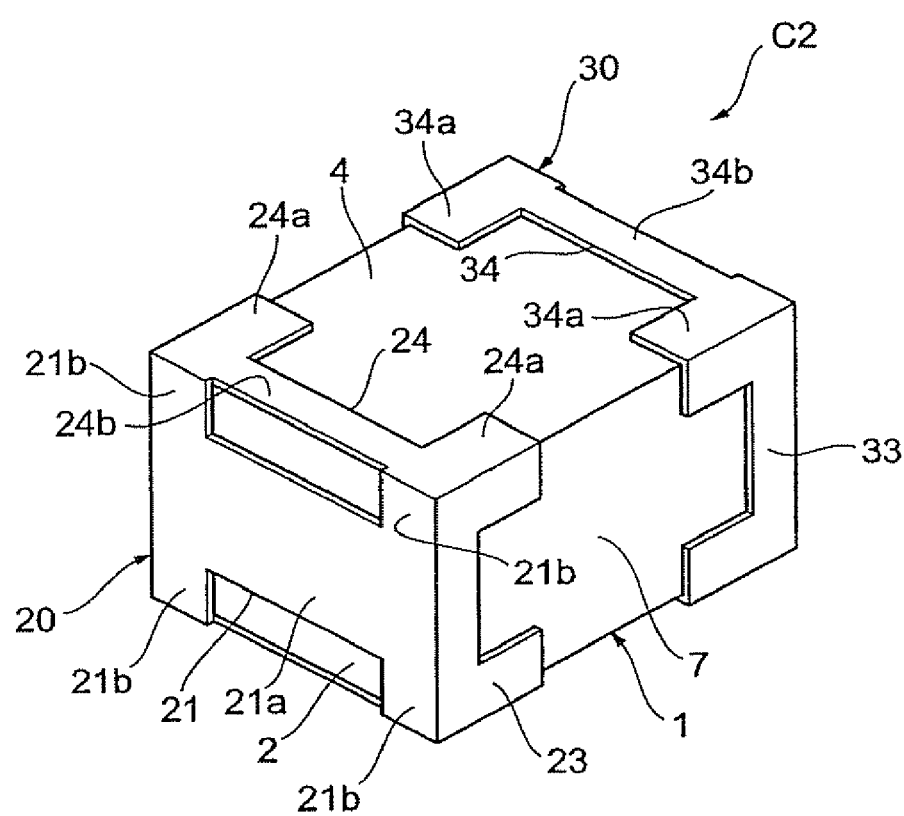
FIG. 12 is a schematic perspective view showing a multilayer capacitor according to a first modification example of the embodiment.
Figure 13:
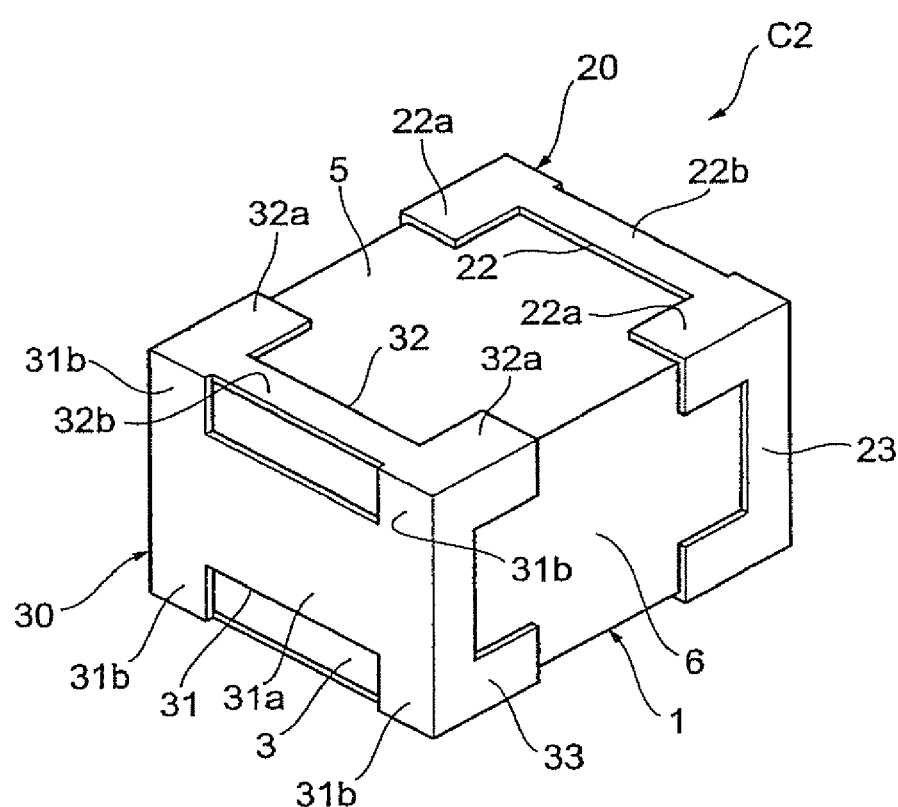
FIG. 13 is a schematic perspective view showing the multilayer capacitor according to the first modification example of the embodiment.
Figure 14:
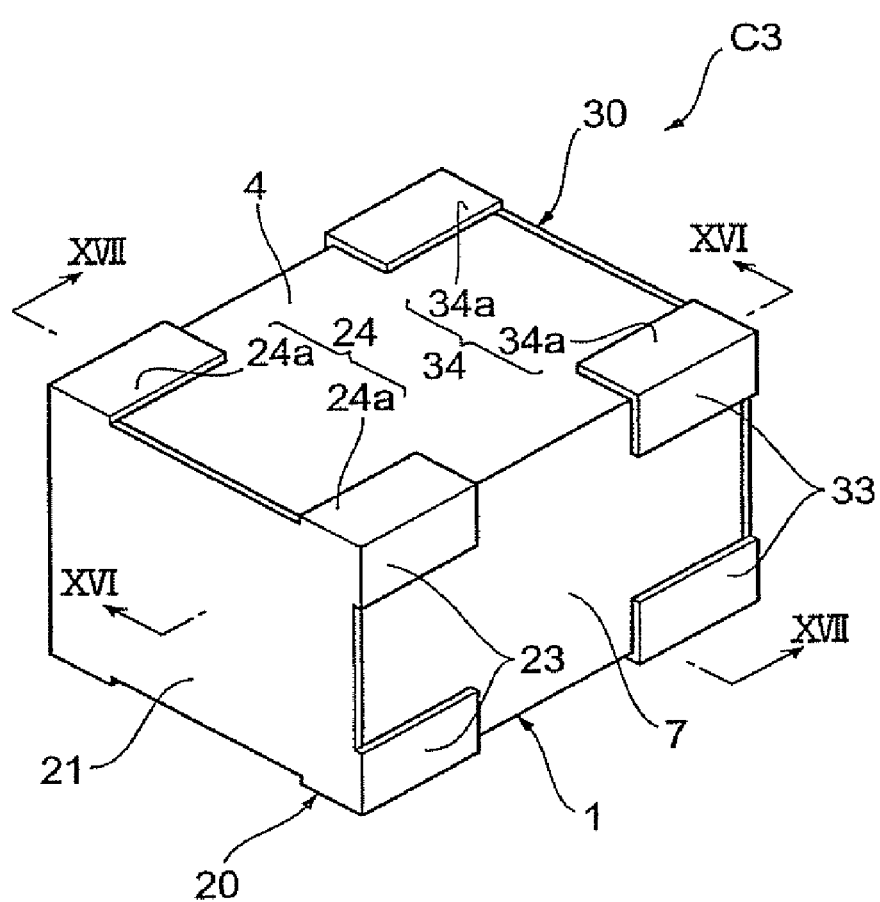
FIG. 14 is a schematic perspective view showing a multilayer capacitor according to a second modification example of the embodiment.
Figure 15:
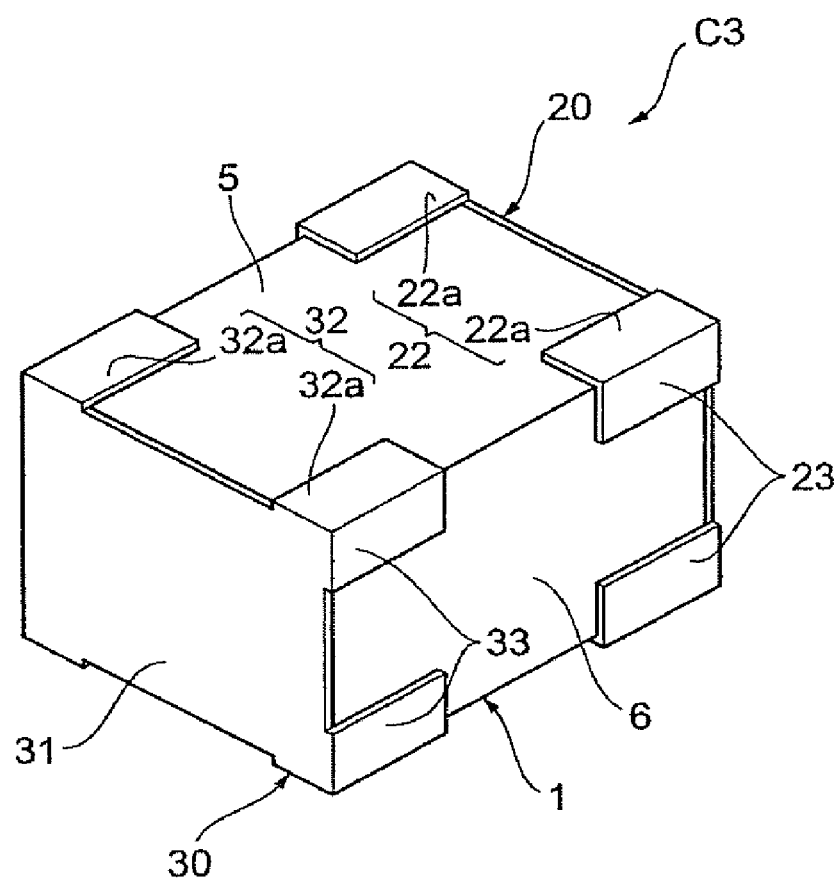
FIG. 15 is a schematic perspective view showing the multilayer capacitor according to the second modification example of the embodiment.
Figure 16:
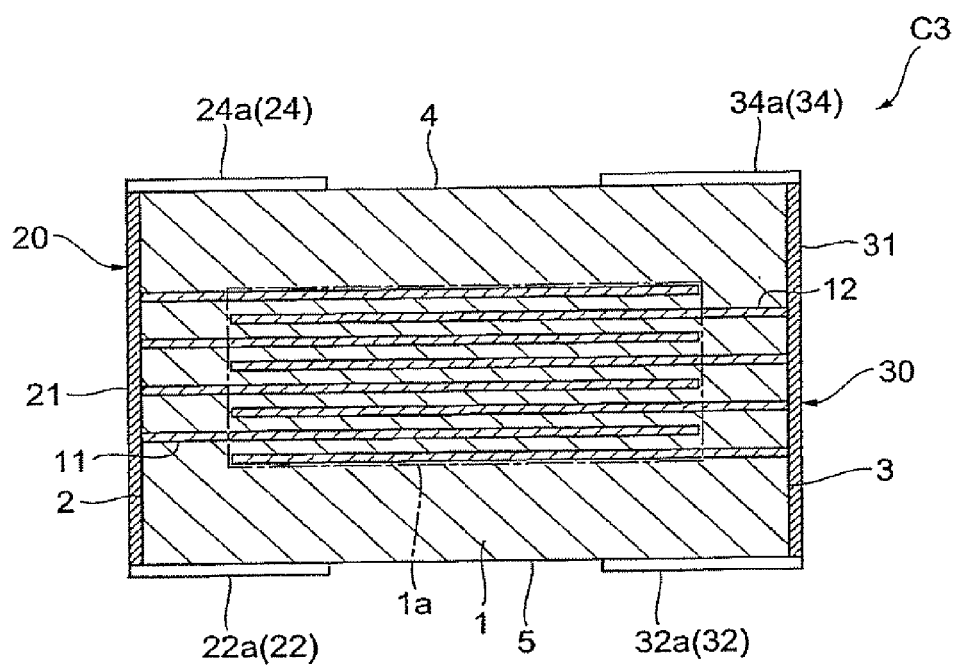
FIG. 16 is a drawing showing a sectional configuration along line XVI-XVI in FIG. 14.
Figure 17:
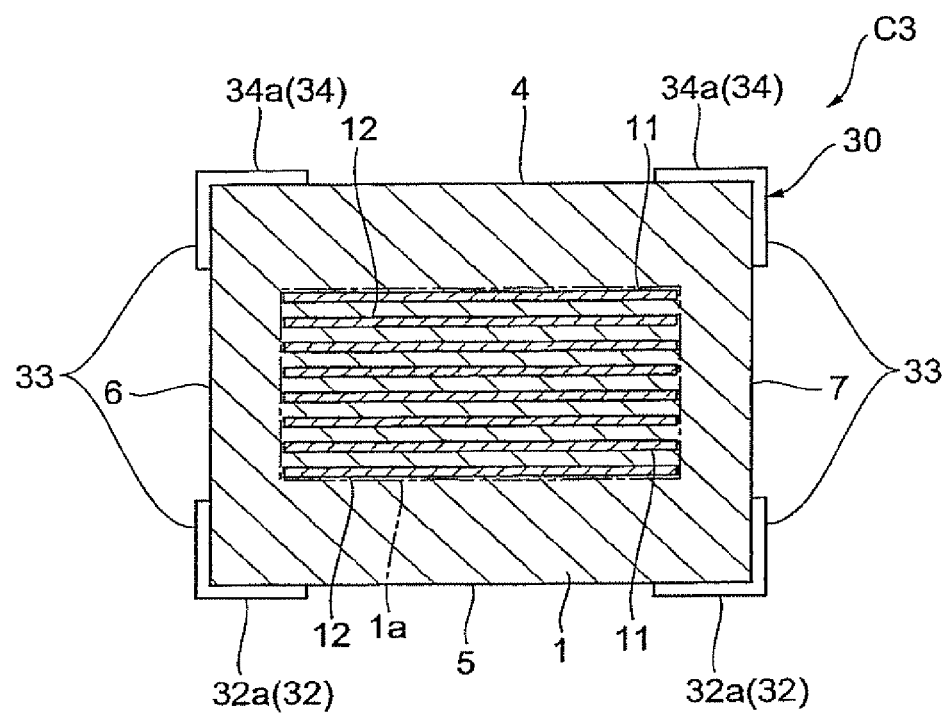
FIG. 17 is a drawing showing a sectional configuration along line XVII-XVII in FIG. 14.
Figure 18:
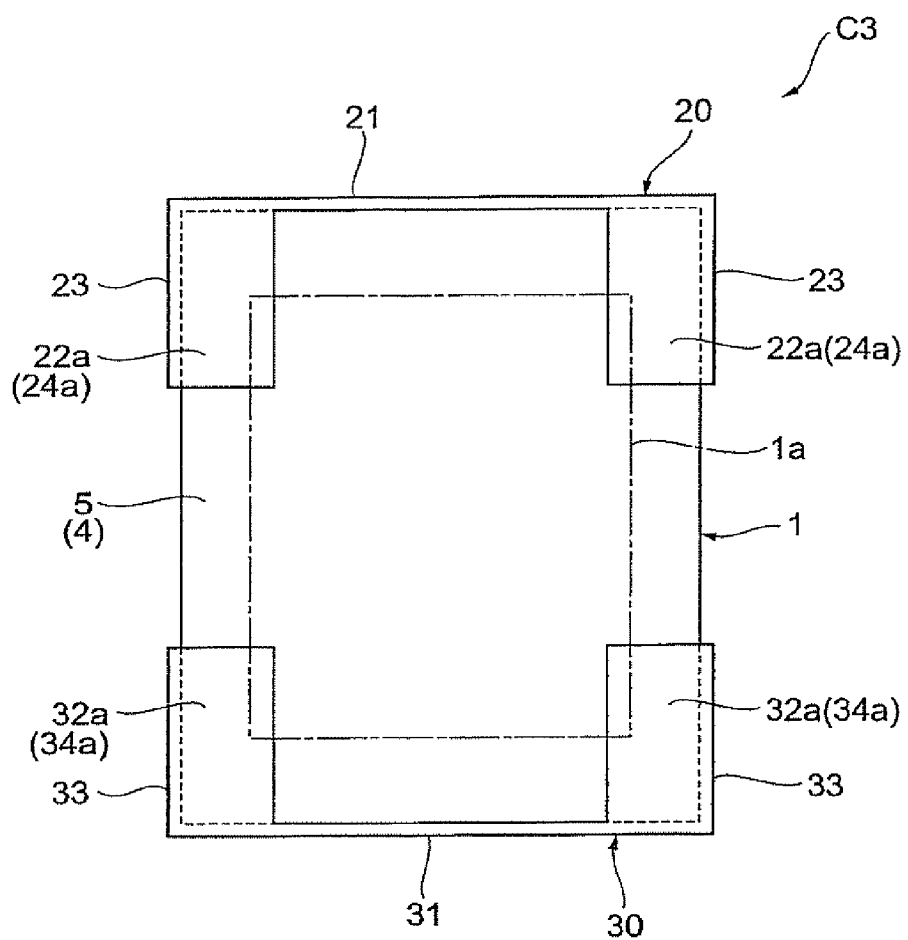
FIG. 18 is a schematic drawing for explaining a relation between first and second terminal electrodes and an element body region.
Figure 19:
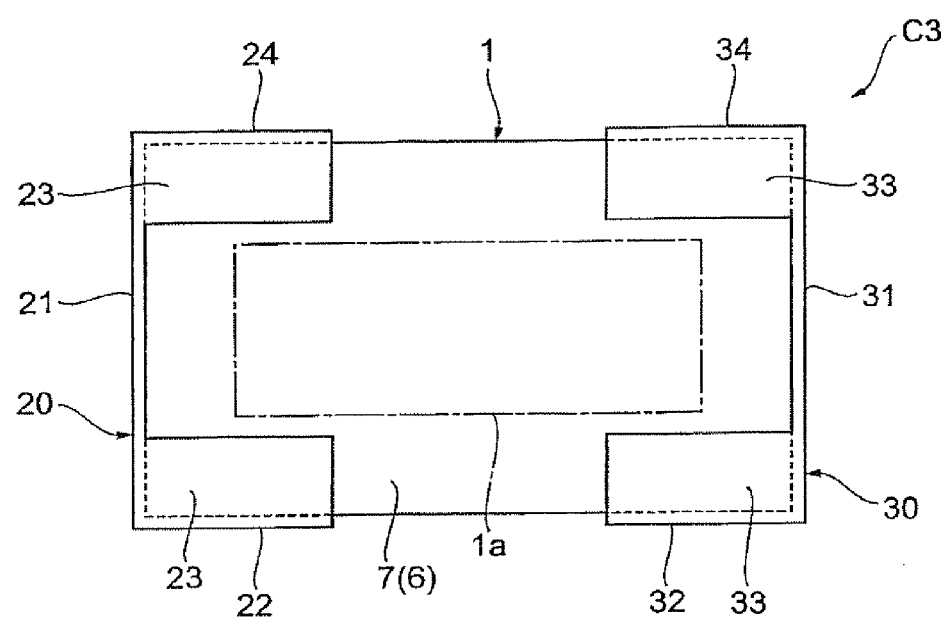
FIG. 19 is a schematic drawing for explaining a relation between first and second terminal electrodes and an element body region.
Figure 20:
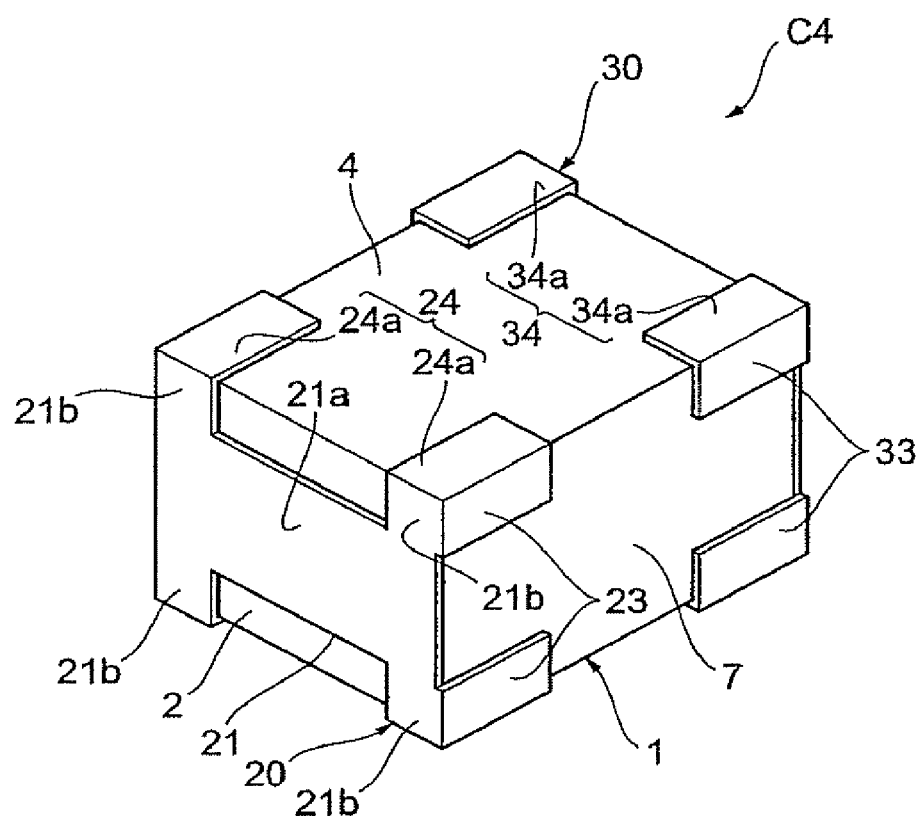
FIG. 20 is a schematic perspective view showing a multilayer capacitor according to a third modification example of the embodiment.
Figure 21:
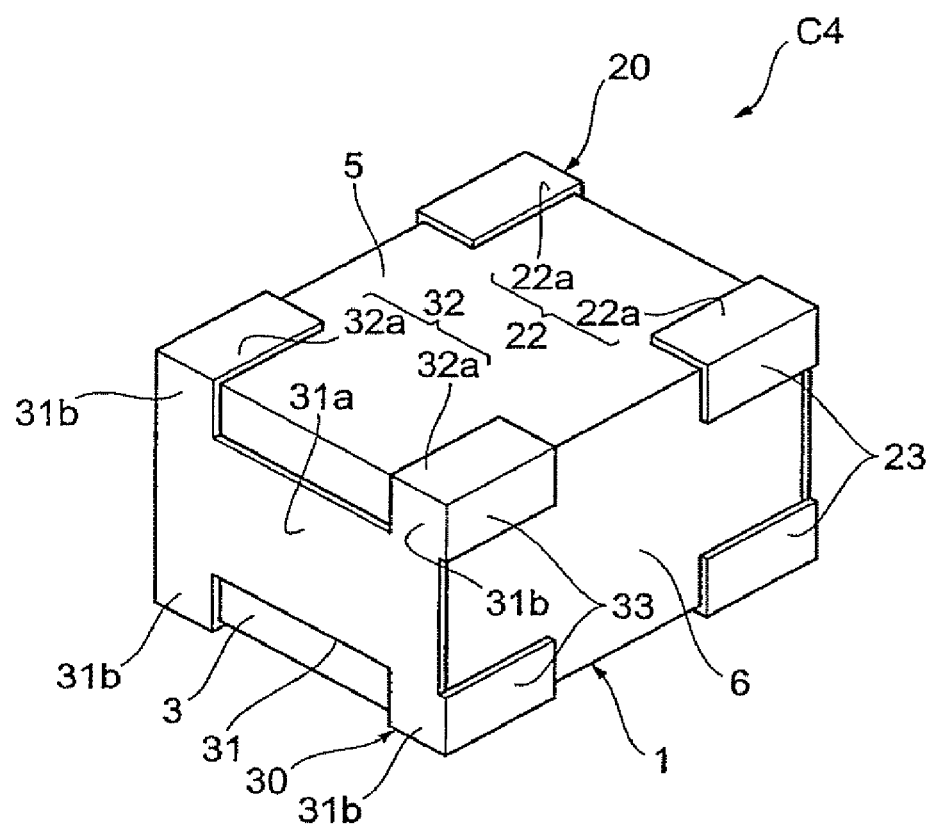
FIG. 21 is a schematic perspective view showing the multilayer capacitor according to the third modification example of the embodiment.
Figure 22:
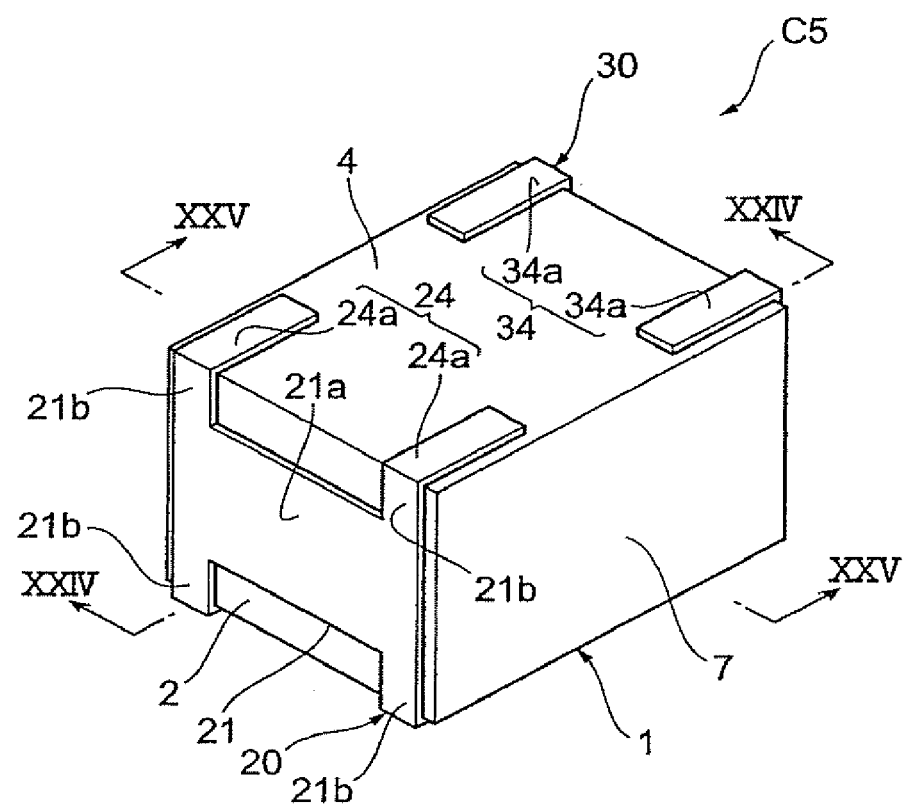
FIG. 22 is a schematic perspective view showing a multilayer capacitor according to a fourth modification example of the embodiment.
Figure 23:
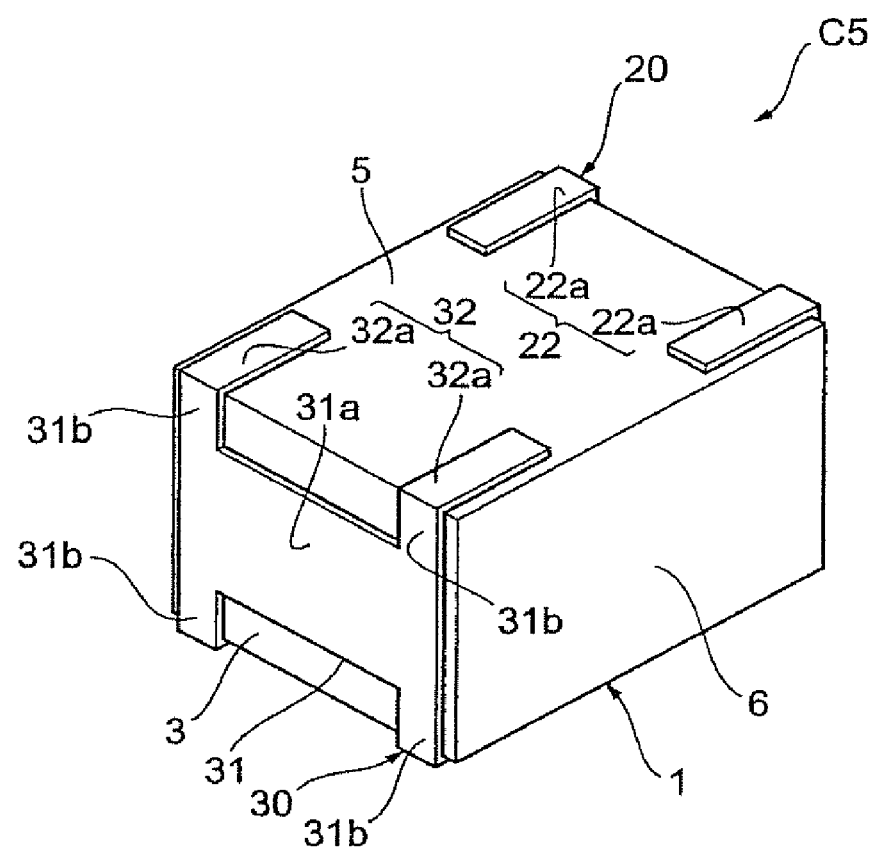
FIG. 23 is a schematic perspective view showing the multilayer capacitor according to the fourth modification example of the embodiment.
Figure 24:
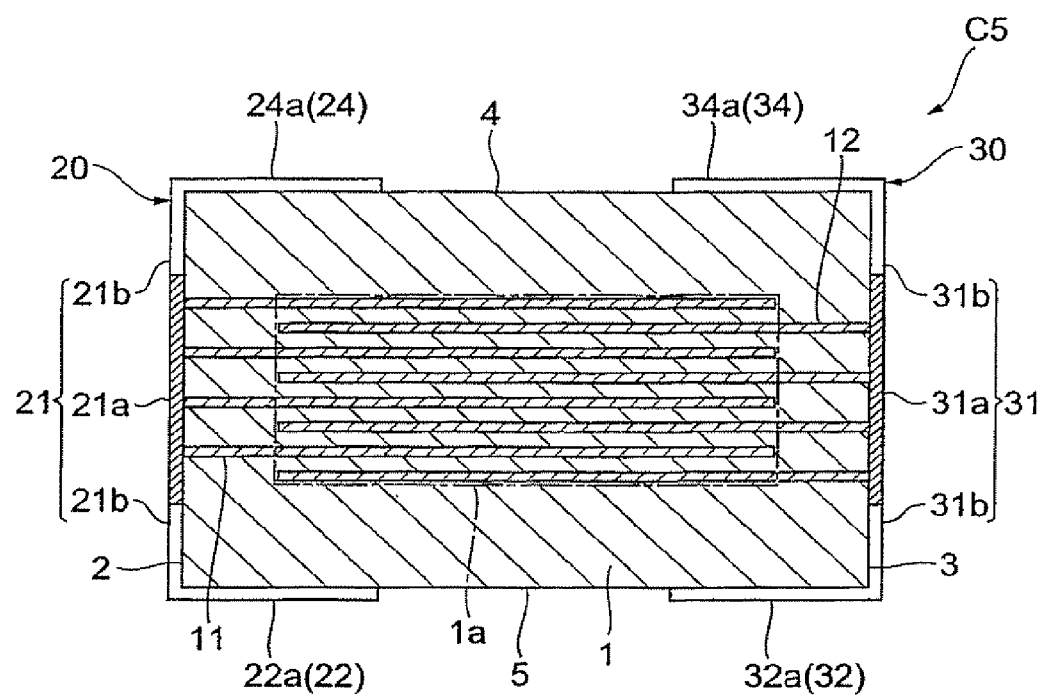
FIG. 24 is a drawing showing a sectional configuration along line XXIV-XXIV in FIG. 22.
Figure 25:
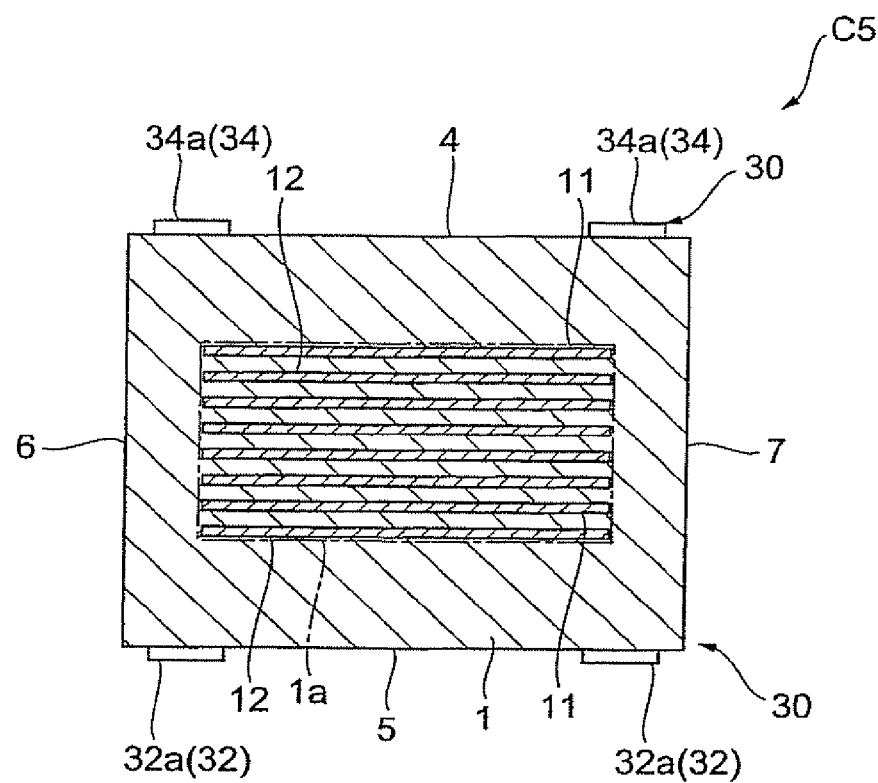
FIG. 25 is a drawing showing a sectional configuration along line XXV-XXV in FIG. 22.
Figure 26:
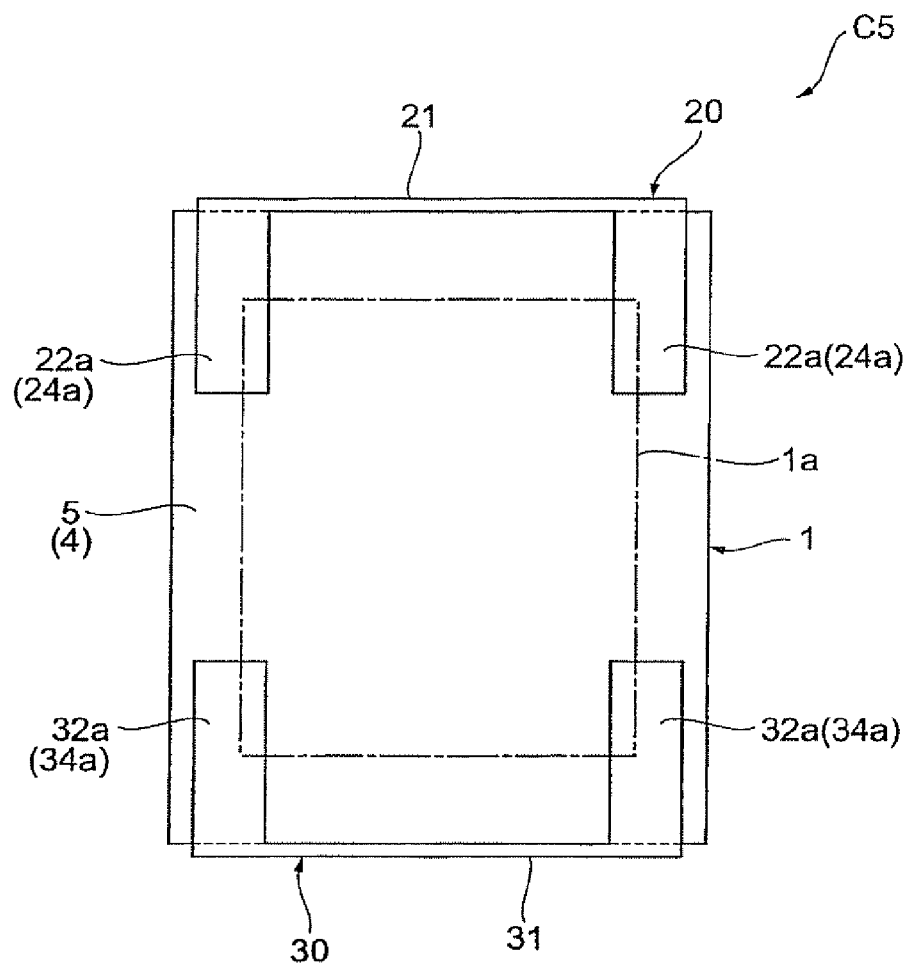
FIG. 26 is a schematic drawing for explaining a relation between first and second terminal electrodes and an element body region.

In the multilayer capacitor C2 of the first modification example shown in FIGS. 12 and 13, each of the first electrode portions 21, 31 has a first region 21a, 31a and four second regions 21b, 31b and is of a near H shape.

The first region 21a has a predetermined gap from the ridgeline made by the first end face 2 and the first side face 4 and from the ridgeline made by the first end face 2 and the second side face 5, extends in the third direction between the ridgeline made by the first end face 2 and the third side face 6 and the ridgeline made by the first end face 2 and the fourth side face 7, and is of a rectangular shape. The first region 21a is formed so as to cover the portions of the first internal electrodes 11 exposed in the first end face 2, and is physically and electrically connected to the exposed portions.

Each second region 21b extends in the second direction along the ridgeline made by the first end face 2 and the third side face 6 or along the ridgeline made by the first end face 2 and the fourth side face 7 from an end of the first region 21a so as to connect the first region 21a and the first region 22a, 24a of the second and fourth electrode portions 22, 24.

The first region 31a has a predetermined gap from the ridgeline made by the second end face 3 and the first side face 4 and from the ridgeline made by the second end face 3 and the second side face 5, extends in the third direction between the ridgeline made by the second end face 3 and the third side face 6 and the ridgeline made by the second end face 3 and the fourth side face 7, and is of a rectangular shape. The first region 31a is formed so as to cover the portions of the second internal electrodes 12 exposed in the second end face 3, and is physically and electrically connected to the exposed portions.

Each second region 31b extends in the second direction along the ridgeline made by the second end face 3 and the third side face 6 or along the ridgeline made by the second end face 3 and the fourth side face 7 from an end of the first region 31a so as to connect the first region 31a and the first region 32a, 34a of the second and fourth electrode portions 32, 34.

In the multilayer capacitors C3, C4 of the second and third modification examples shown in FIGS. 14 to 21, each of the second electrode portions 22, 32 is composed of only a pair of first regions 22a, 32a, without the aforementioned second region 22b, 32b. The third electrode portions 23, 33 are located at corners of the third and fourth side faces 6, 7 and are arranged with a gap in the second direction. The third electrode portions 23, 33 are separated from each other in the second direction. The first regions 22a are arranged with a gap in the third direction, i.e., separated from each other in the third direction. The first regions 24a are arranged with a gap in the third direction, i.e., separated from each other in the third direction. The first regions 32a are arranged with a gap in the third direction, i.e., separated from each other in the third direction. The first regions 34a are arranged with a gap in the third direction, i.e., separated from each other in the third direction.

In the multilayer capacitor C5 of the fourth modification example shown in FIGS. 22 to 26, the first and second terminal electrodes 20, 30 are made without the third electrode portions 23, 33, i.e., the first and second terminal electrodes 20, 30 (third electrode portions 23, 33) are not disposed on the third and fourth side faces 6, 7. The first regions 22a are arranged with a gap in the third direction, i.e., separated from each other in the third direction. The first regions 24a are arranged with a gap in the third direction, i.e., separated from each other in the third direction. The first regions 32a are arranged with a gap in the third direction, i.e., separated from each other in the third direction. The first regions 34a are arranged with a gap in the third direction, i.e., separated from each other in the third direction.

In the multilayer capacitor C5, each of the first electrode portions 21, 31 is located with a predetermined gap from the ridgeline made by the first end face 2 and the third side face 6 and from the ridgeline made by the first end face 2 and the fourth side face 7. The first regions 22a, 32a of the second electrode portions 22, 32 are located with a predetermined gap from the ridgeline made by the second side face 5 and the third side face 6 and from the ridgeline made by the second side face 5 and the fourth side face 7. The first regions 24a, 34a of the fourth electrode portions 24, 34 are located with a predetermined gap from the ridgeline made by the first side face 4 and the third side face 6 and from the ridgeline made by the first side face 4 and the fourth side face 7.

In the multilayer capacitors C2-C5 of the first to fourth modification examples, the second electrode portions 22, 32 or the fourth electrode portions 24, 34 overlap just in a small overlap area with the element body region 1a, and it is thus feasible to prevent the mechanical strain caused in the element body region 1a of the capacitor element body 1 with application of voltage between the first and second terminal electrodes 20, 30, i.e., between the first and second internal electrodes 11, 12, from being transmitted to the second electrode portions 22, 32 or the fourth electrode portions 24, 34.

The above described the preferred embodiments of the present invention, but it is noted that the present invention does not necessarily have to be limited to the above-described embodiments but can be modified in many ways without departing from the scope thereof.

In each of the embodiment and modification examples each of the first and second terminal electrodes 20, 30 has the second electrode portion 22, 32 and the fourth electrode portion 24, 34, but it is sufficient that each terminal electrode has at least one of the electrode portions. For example, in a case where the second side face 5 is defined as a face to be opposed to an external substrate or the like, the fourth electrode portions 24, 34 do not always have to be provided. In a case where the first side face 4 is defined as a face to be opposed to an external substrate or the like, the second electrode portions 22, 32 do not always have to be provided.

In each of the embodiment and modification examples the third electrode portions 23, 33 of the first and second terminal electrodes 20, 30 do not overlap with the element body region 1a when viewed along the third direction, but the present invention does not have to be limited to this configuration. The third electrode portions 23, 33 may overlap with the element body region 1a when viewed along the third direction. In this case, the multilayer capacitor in which the third electrode portions 23, 33 overlap with the element body region 1a when viewed along the third direction shows deterioration of the effect of preventing the mechanical strain in the element body region 1a from being transmitted, when compared with the multilayer capacitor in which the third electrode portions 23, 33 do not overlap with the element body region 1a when viewed along the third direction, but the degree of deterioration of the effect is small because the transmission of vibration is dominated by that from the second electrode portions 22, 32 or from the fourth electrode portions 24, 34.

From the invention thus described, it will be obvious that the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A multilayer capacitor comprising:
a capacitor element body with a dielectric property having first and second faces facing each other, and a third face extending in a first direction in which the first and second faces face each other, so as to connect the first and second faces, the third face is opposed to a mount surface;
a first internal electrode with an end exposed in the first face and a second internal electrode with an end exposed in the second face, said first internal electrode and second internal electrode being arranged in the capacitor element body so as to face each other in a second direction perpendicular to the first direction and to the third face, while sandwiching at least a portion of the capacitor element body;
a first terminal electrode having a first electrode portion disposed on the first face and connected to the exposed portion of the first internal electrode in the first face, and a second electrode portion disposed on the third face and connected to the first electrode portion; and
a second terminal electrode having a first electrode portion disposed on the second face and connected to the exposed portion of the second internal electrode in the second face, and a second electrode portion disposed on the third face and connected to the first electrode portion;
wherein the capacitor element body comprises an element body region sandwiched between the first internal electrode and the second internal electrode,
wherein each of the second electrode portions of the first and second terminal electrodes comprises a pair of first regions extending from an edge in the first direction of the third face and arranged with the gap in a third direction perpendicular to the first and second directions,
wherein when viewed along the second direction, the pair of first regions overlap with portions of ends in the first and third directions of the element body region, and
wherein when viewed along the second direction, a portion of the element body region located between overlaps thereof with the pair of first regions does not overlap with each of the second electrode portions of the first and second terminal electrodes, at an end in the first direction of the element body region.

2. The multilayer capacitor according to claim 1, wherein an area A1 of each of the first regions and an area A2 of an overlap thereof with the element body region when viewed along the second direction satisfy the following relation:

$$0 \leq A2/A1 \leq 0.50.$$

3. The multilayer capacitor according to claim 2, wherein each of the second electrode portions further comprises a second region extending so as to connect the pair of first regions,
wherein the length in the first direction of the second region is shorter than the length in the first direction of the first region, and
wherein the second region does not overlap with the element body region when viewed along the second direction.

4. The multilayer capacitor according to claim 3, wherein the capacitor element body further has fourth and fifth faces extending in the first direction so as to connect the first and second faces, and facing each other in the third direction,
wherein each of the first and second terminal electrodes has a third electrode portion disposed on the fourth and fifth faces and connected to the first and second electrode portions, and
wherein the third electrode portion does not overlap with the element body region when viewed along the third direction.

5. The multilayer capacitor according to claim 2, wherein the capacitor element body further has fourth and fifth faces extending in the first direction so as to connect the first and second faces, and facing each other in the third direction,
wherein each of the first and second terminal electrodes has a third electrode portion disposed on the fourth and fifth faces and connected to the first and second electrode portions, and
wherein the third electrode portion does not overlap with the element body region when viewed along the third direction.

6. The multilayer capacitor according to claim 1, wherein each of the second electrode portions further comprises a second region extending so as to connect the pair of first regions,
wherein the length in the first direction of the second region is shorter than the length in the first direction of the first region, and
wherein the second region does not overlap with the element body region when viewed along the second direction.

7. The multilayer capacitor according to claim 6, wherein the capacitor element body further has fourth and fifth faces extending in the first direction so as to connect the first and second faces, and facing each other in the third direction,
wherein each of the first and second terminal electrodes has a third electrode portion disposed on the fourth and fifth faces and connected to the first and second electrode portions, and
wherein the third electrode portion does not overlap with the element body region when viewed along the third direction.

8. The multilayer capacitor according to claim 1, wherein the capacitor element body further has fourth and fifth faces extending in the first direction so as to connect the first and second faces, and facing each other in the third direction,
wherein each of the first and second terminal electrodes has a third electrode portion disposed on the fourth and fifth faces and connected to the first and second electrode portions, and
wherein the third electrode portion does not overlap with the element body region when viewed along the third direction.

9. A multilayer capacitor comprising:
a capacitor element body with a dielectric property having first and second faces facing each other, and a third face extending in a first direction in which the first and second faces face each other, so as to connect the first and second faces, the third face is opposed to a mount surface;
a first internal electrode with an end exposed in the first face and a second internal electrode with an end exposed in the second face, said first internal electrode and second internal electrode being arranged in the capacitor element body so as to face each other in a second direction perpendicular to the first direction and to the third face, while sandwiching at least a portion of the capacitor element body;
a first terminal electrode having a first electrode portion disposed on the first face and connected to the exposed portion of the first internal electrode in the first face, and a second electrode portion disposed on the third face and connected to the first electrode portion; and
a second terminal electrode having a first electrode portion disposed on the second face and connected to the exposed portion of the second internal electrode in the second face, and a second electrode portion disposed on the third face and connected to the first electrode portion;
wherein the capacitor element body comprises an element body region sandwiched between the first internal electrode and the second internal electrode,
wherein each of the second electrode portions of the first and second terminal electrodes comprises a pair of first regions extending from an edge in the first direction of the third face and arranged with the gap in a third direction perpendicular to the first and second directions,
wherein when viewed along the second direction, edges in the first direction of the element body region are located between the pair of first regions in the third direction and do not overlap with each of the second electrode portions.

10. The multilayer capacitor according to claim 9, wherein the capacitor element body further has fourth and fifth faces extending in the first direction so as to connect the first and second faces, and facing each other in a third direction perpendicular to the first and second directions,
wherein each of the first and second terminal electrodes has a third electrode portion disposed on the fourth and fifth faces and connected to the first and second electrode portions, and
wherein the third electrode portion does not overlap with the element body region when viewed along the third direction.

11. The multilayer capacitor according to claim 9,
wherein each of the second electrode portions further comprises a second region extending so as to connect the pair of first regions,
wherein the length in the first direction of the second region is shorter than the length in the first direction of the first region, and
wherein the second region does not overlap with the element body region when viewed along the second direction.

* * * * *